United States Patent
Kasazumi et al.

(10) Patent No.: US 7,859,972 B2
(45) Date of Patent: Dec. 28, 2010

(54) HOLOGRAPHIC OPTICAL INFORMATION RECORDING/REPRODUCING DEVICE AND HOLOGRAPHIC OPTICAL INFORMATION RECORDING/REPRODUCING METHOD

(75) Inventors: Kenichi Kasazumi, Osaka (JP); Tomoya Sugita, Osaka (JP); Tetsuro Mizushima, Osaka (JP); Kazuhisa Yamamoto, Osaka (JP); Shinichi Kadowaki, Hyogo (JP)

(73) Assignee: Panasonic Corporation, Osaka (JP)

( * ) Notice: Subject to any disclaimer, the term of this patent is extended or adjusted under 35 U.S.C. 154(b) by 790 days.

(21) Appl. No.: 11/885,259

(22) PCT Filed: Mar. 1, 2006

(86) PCT No.: PCT/JP2006/303892

§ 371 (c)(1),
(2), (4) Date: Aug. 29, 2007

(87) PCT Pub. No.: WO2006/093196

PCT Pub. Date: Sep. 8, 2006

(65) Prior Publication Data

US 2008/0117788 A1    May 22, 2008

(30) Foreign Application Priority Data

Mar. 2, 2005   (JP) .............................. 2005-058085

(51) Int. Cl.
*G11B 7/00* (2006.01)
(52) U.S. Cl. .................................. 369/103; 369/124.04
(58) Field of Classification Search ........................ None
See application file for complete search history.

(56) References Cited

U.S. PATENT DOCUMENTS

| 5,671,073 A | 9/1997 | Psaltis et al. |
| 2002/0114027 A1 | 8/2002 | Horimai |
| 2003/0063342 A1 | 4/2003 | Horimai |

FOREIGN PATENT DOCUMENTS

| JP | 2000-81829 | 3/2000 |
| JP | 2000-268380 | 9/2000 |
| JP | 2005-32438 | 2/2005 |

*Primary Examiner*—Paul Huber
(74) *Attorney, Agent, or Firm*—Wenderoth, Lind & Ponack, L.L.P.

(57) ABSTRACT

A holographic optical information recording/reproducing device is provided with a laser light source 1 and a polarizing beam splitter 8 for splitting a light from the laser light source 1. At the time of recording information, one of light beams split by the polarizing beam splitter 8 is modulated by a spatial light modulating element 2 to form a beam array, which becomes a signal light 25, whereas the other split light beam becomes a reference light 22. Interference fringes generated by the signal light 25 and the reference light 22 are recorded as holograms in a holographic disc 5. At the time of reproducing the information, only the reference light 22 is irradiated to the holographic disc 5 and its diffracted light is detected. At this time, the holographic optical information recording/reproducing device makes the power of the reference light 22 in the holographic disc 5 for information reproduction larger than a sum of the power of the reference light 22 and the power of the signal light 25 in the holographic disc 5 for information recording.

27 Claims, 18 Drawing Sheets

HOLOGRAPHIC OPTICAL INFORMATION RECORDING/REPRODUCING DEVICE AND HOLOGRAPHIC OPTICAL INFORMATION RECORDING/REPRODUCING METHOD

FIELD OF THE INVENTION

This application is a 371 of PCT/JP2006/303892, filed Mar. 1, 2006.

The present invention relates to a holographic optical information recording/reproducing device and a holographic optical information recording/reproducing method used in an external storage unit of a computer, a video/sound information storage unit or the like.

BACKGROUND ART

A compact disc (CD) enables the recording of 74 minutes of music data or 650 MB of digital data using an optical system including a light source having a wavelength of 780 nm and an objective lens having a numerical aperture of 0.45. Further, a digital versatile disc (DVD) enables the recording of 2 hours and 15 minutes of MPEG2 moving pictures and 4.7 GB of digital data using an optical system including a light source having a wavelength of 650 nm and an objective lens having a numerical aperture of 0.6.

In recent years, reflecting the broadcasting of high-definition moving pictures having a horizontal resolution of 1000 pixels and the high functionalization of personal computers, there have been even more expectations for high-density and high-capacity optical discs. In response to such expectations, an optical disc system including a combination of a light source having a wavelength of about 400 nm and an objective lens having a numerical aperture of 0.85, and the like have been proposed and a recording capacity exceeding 20 GB per side is about to be realized.

In this way, optical disc devices have realized higher data recording densities on discs using light sources having shorter wavelengths and objective lenses having larger numerical apertures. However, such an approach to high density recording by the shorter wavelength of the light source and the larger numerical aperture of the lens is coming closer to a limit. Specifically, in a wavelength range equal to or below 400 nm, it is difficult to control aberrations since the wavelength dispersion of a glass material used for the lens becomes large. Further, the use of a solid immersion lens technology being developed to increase the numerical aperture causes problems such as difficulty in exchanging discs since a lens working distance, i.e. a distance between the lens and the disc becomes extremely short (about 50 nm). Thus, a great deal of attention is being drawn to the holographic recording technology in order to overcome these problems and realize high data recording density on discs.

FIG. 20 is a diagram of an optical disc system employing shift multiplexing recording and, for example, proposed by Psaltis et al, showing the schematic construction of an optical system of this optical disc system (see, for example, patent literature 1). An optical disc system 200 employing shift multiplexing recording and shown in FIG. 20 includes a laser light source 201, a beam expander 207, a polarizing beam splitter 208, a mirror 210, a spatial light modulating element 202, Fourier transform lenses 203 and 204, a holographic disc 205, a half wavelength plate 211, a condenser lens 212 and a two-dimensional light receiving element array 206.

A light from the laser light source 201 is split in the polarizing beam splitter 208 after having the diameter thereof expanded by the beam expander 207. One split beam has a propagating direction thereof changed by the mirror 210 and transmits through the spatial light modulating element 202 after transmitting through the half wavelength plate 211. The beam having transmitted through the spatial light modulating element 202 is condensed by the Fourier transform lens 203, and the condensed beam is irradiated onto the holographic disc 205 as a signal light 220. The other split beam is condensed by the condenser lens 212, and this condensed other beam becomes a reference light 222 and is irradiated onto the same position on the holographic disc 205 as the irradiated position of the signal light 220. The holographic disc 205 is constructed by sealing a holographic medium such as a photopolymer between two glass substrates, and interference fringes of the signal light 220 and the reference light 222 are recorded on the holographic medium.

Here, the spatial light modulating element 202 includes an optical switch array in which optical switches are two-dimensionally arrayed and independently turned on and off in response to an input signal 223. Each optical switch is a cell corresponding to 1 bit of image information. For example, the spatial light modulating element 202 having 1024 cells×1024 cells can simultaneously display 1 MB of information. The 1 MB of information to be displayed on the spatial light modulating element 202 is converted into a two-dimensional beam array upon transmitting through the spatial light modulating element 202 and condensed by the Fourier transform lens 203.

Upon reproducing a recorded signal, only the reference light 222 is irradiated onto the holographic disc 205. Then, a reproduced signal light 221, which is a diffracted light from the holographic disc 205, is converted into a two-dimensional beam array upon transmitting through the Fourier transform lens 204, and this beam array is irradiated onto the two-dimensional light receiving element array 206.

Here, the two-dimensional light receiving element array 206 is such that light receiving elements are two-dimensionally arrayed and corresponds to the optical switch array in the spatial light modulating element 202. Accordingly, the respective beams in the two-dimensional light beam array are photoelectrically converted by the corresponding light receiving elements in the two-dimensional light receiving element array 206 and a reproduced signal 224 is outputted.

The characteristic feature of the optical disc system 200 shown in FIG. 20 is to enable angle multiplexing recording, i.e. the multiplexing recording of information by changing incident angles of the signal light and the reference light on the optical disc since the holographic medium is as thick as about 1 mm and the interference fringes are recorded as thick gratings, i.e. Bragg gratings, whereby it can be realized to enlarge the capacity of information to be recorded in the optical disc. In the optical disc system shown in FIG. 20, angle multiplexing is reached by shifting the irradiated position of the reference light having a spherical wave instead of changing the incident angle of the reference light 222. This system exploits slight changes of the incident angle of the reference light sensed by the respective parts of the holographic disc 205 when the holographic disc 205 is slightly rotated to shift the recording position.

In such a construction, a large volume of data can be recorded in one hologram and parallel recording and reproduction are possible. Thus, a high-speed optical information recording/reproducing device can be realized. Further, since multiplexing recording is possible, a large-capacity optical information recording/reproducing device can be realized.

However, since the light amount of the reproduced diffracted light is small in the above conventional construction, electric noise created in the two-dimensional light receiving element array 206 becomes relatively large, thereby reducing the S/N ratio of the reproduced signal. In order to reproduce the signal with a sufficient S/N ratio, the transfer rate had to be decreased. Further, recording could be made in the same kinds of media only at the same recording density in the above conventional construction.

Further, since the signal light is cut off in the respective cells of the spatial light modulating element 202 in the above conventional construction, light utilization efficiency is low. Thus, a coherent light source having a large output was needed. Furthermore, the transfer rate during the recording was low. Further, in the above conventional construction, the magnification of the lens changes with time or with ambient temperature, which has caused a problem that a spot array of the reproduced signal light 221 on the two-dimensional light receiving element array 206 do not coincide with the light receiving cells of the two-dimensional light receiving element array 206 to deteriorate the reproduced signal.

Further, in the above conventional construction, the positions of the spots of the reproduced signal light 221 do not coincide with the positions of the light receiving cells of the two-dimensional light receiving element array 206 due to the distortion of the lens at the time of reproducing the signal, thereby causing a problem of deteriorating the reproduced signal. Furthermore, in the above conventional construction, the lens needs to be designed to strictly satisfy an fsin θ condition so that the distortion of the lens is equal to or below 0.2%, thereby causing problems of increasing the number of constituent lens of the lens, the weight of the lens and the cost of the lens.

The above conventional construction also had a problem of taking a long time to verify the information recorded in the holographic disc 205. This is because the rotating speed of the holographic disc 205 is very slow, and the reproduction of the recorded holograms for verification took a time for at least one turn of the disc. For example, if the holograms are continuously recorded in the circumferential direction of the holographic disc at intervals of 30 micrometers at a radius position of 40 mm of the holographic disc 205, the linear velocity of the disc is 30 mm/second and the circumferential distance when the disc makes one turn is about 250 mm. Since the number of revolutions of the holographic disc is constant during the recording, it takes about 8 seconds from the recording to the verification.

Further, the above conventional construction had a problem of taking a long time to fix the recording material of unrecorded parts when the recording is finished. Further, since the pitch of the light receiving cells of the two-dimensional light receiving element array 206 is substantially equal to that of the spot array of the reproduced signal light 221 in the above conventional construction, there was a likelihood that the pitch of the light receiving cells of the part or entirety of two-dimensional light receiving element array 206 became larger than that of the spot array of the reproduced signal light 221 due to the change of the magnification of the lens, the distortion of the lens and the like with ambient temperature and/or time, thereby considerably deteriorating the reproduced signal.

In another conventional construction, the pitch of light receiving cells of a two-dimensional light receiving element array is at least half as large as that of a spot array of a reproduced signal light. Since the number of the cells of the two-dimensional light receiving element array increases, there was problems of increasing the cost of the two-dimensional light receiving element array and signal lead lines from the two-dimensional light receiving element array and enlarging the circuit scale of a two-dimensional data processing circuit.

Further, since the size of the light receiving cells of the two-dimensional light receiving element array 206 is substantially equal to the pitch of the light receiving cells of the two-dimensional light receiving element array 206 in the above conventional construction, there was a problem that the influence of intersymbol interference from adjacent spots of the reproduced signal light 221 became large to deteriorate the reproduced signal. Furthermore, since the size of the cells of the spatial light modulating element 202 is large in the above conventional construction, the size of the spots of the reproduced signal light 221 becomes large. Thus, there was a problem that the influence of intersymbol interference became large to deteriorate the reproduced signal.

Further, since the first null positions of the spot of the reproduced signal light 221 differ from the positions of the adjacent cells of the two-dimensional light receiving element array 206 in the above conventional construction, there was a problem that the influence of intersymbol interference became large to deteriorate the reproduced signal. Further, in the above conventional construction, there are provided apertures having the size of a $0^{th}$-order light of a diffraction pattern determined by the apertures of the cells of the spatial light modulating element 202 when the signal light 220 is incident on the holographic disc 205. Thus, there was a problem that the spot size of the signal light 220 on the two-dimensional light receiving element array 206 became large to reduce the quality of the reproduced signal by the intersymbol interference.

PATENT LITERATURE 1: U.S. Pat. No. 5,671,073

DISCLOSURE OF THE INVENTION

An object of the present invention is to provide a holographic optical information recording/reproducing device and a holographic optical information recording/reproducing method capable of improving the quality of a reproduced signal and reproducing a signal at a high transfer rate.

One aspect of the present invention is directed to a holographic optical information recording/reproducing device, comprising a coherent light source; and beam splitting means for splitting a light from the coherent light source, wherein one of light beams split by the beam splitting means becomes a beam array modulated and arrayed by a spatial light modulating element, the beam array serving as a signal light, the other light beam split by the beam splitting means becomes a reference light, the signal light and the reference light intersect in a recording medium to generate interference fringes and the interference fringes are recoded as holograms in the recording medium at the time of recording information; only the reference light is irradiated to the recording medium and a diffracted light generated in the recording medium is detected by a light receiving element at the time of reproducing information; and the power of the reference light in the recording medium for information reproduction is larger than a sum of the power of the reference light and the power of the signal light in the recording medium for information recording.

Another object of the present invention is directed to a holographic optical information recording/reproducing method using a holographic optical information recording/reproducing device comprising a coherent light source, and beam splitting means for splitting a light from the coherent light source, comprising the steps of: making one of light beams split by the beam splitting means into a beam array modulated and arrayed by a spatial light modulating element, the beam array serving as a signal light, making the other light beam split by the beam splitting means into a reference light, causing the signal light and the reference light to intersect in a recording medium to generate interference fringes and recording the interference fringes as holograms in the recording medium at the time of recording information; and irradiating only the reference light to the recording medium and detecting a diffracted light generated in the recording medium by a light receiving element at the time of reproducing information, wherein the power of the reference light in the recording medium for information reproduction is larger than a sum of the power of the reference light and the power of the signal light in the recording medium for information recording.

According to the present invention, since the power of the reference light in the recording medium for information reproduction is larger than the sum of the power of the reference light and the power of the signal light in the recording medium for information recording, the quality of the reproduced signal can be improved and the signal can be reproduced at a fast transfer rate.

BEST MODES FOR EMBODYING THE INVENTION

Hereinafter, embodiments of the present invention are described with reference to the drawings.

First Embodiment

Figure 1:
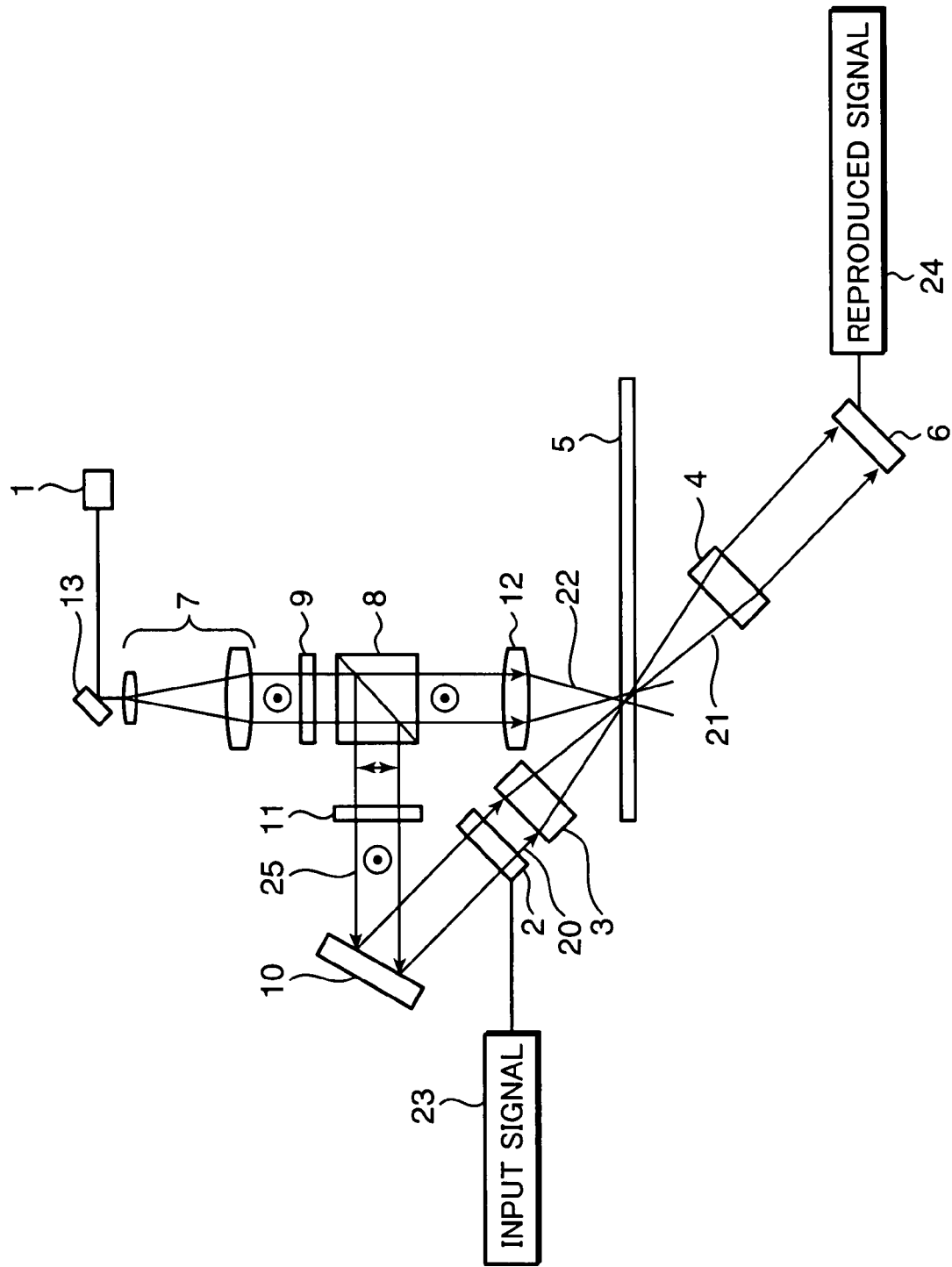
FIG. 1 is a schematic construction diagram of a holographic optical information recording/reproducing device according to a first embodiment of the invention.

FIG. 1 is a schematic construction diagram showing a holographic optical information recording/reproducing device according to a first embodiment of the present invention. A laser light source 1 generates a laser beam having a wavelength of 532.1 nm for generating secondary higher harmonics of a YAG solid laser excited by a semiconductor laser. The light beam from the laser light source 1 has the diameter thereof expanded by a beam expander 7 after being reflected by a mirror 13. The expanded beam is incident on a half wavelength plate 9 and split into a signal light 25 and a reference light 22 by a beam splitter (polarizing beam splitter) 8. The light incident on the half wavelength plate 9 is a linearly polarized light and has, for example, a polarization component in a direction perpendicular to the plane of FIG. 1. By adjusting an angle of rotation of the half wavelength plate 9, a ratio of the polarization component perpendicular to the plane of FIG. 1 of the light incident on the polarizing beam splitter 8 and a polarization component parallel to the plane of FIG. 1 is changed. Out of the light incident on the polarizing beam splitter 8, the polarized wave perpendicular to the plane of FIG. 1 propagates straight to become the reference light 22 and the polarized wave parallel to the plane of FIG. 1 is reflected to become the signal light 25.

In order to efficiently record a hologram, it is necessary to parallelize the polarization direction of the signal light 25 and that of the reference light 22 in a holographic disc 5 and to align the polarization components of the signal light 25 and the reference light 22 with the polarization components in the direction perpendicular to the plane of FIG. 1. To this end, the signal light 25 has the polarization direction thereof rotated by 90° by the half wavelength plate 11 to become the polarized wave perpendicular to the plane of FIG. 1. A spatial light modulating element 2 includes a two-dimensionally arranged optical switch array and converts the incident light beam into a signal light beam array 20 by turning on and off in response to an input signal 23. The signal light beam array 20 is condensed into the holographic disc 5 by a lens 3. Further, the reference light 22 intersects with the signal light 25 (signal light beam array 20) in the holographic disc 5 through a condenser lens 12, thereby generating interference fringes. The holographic disc 5 is such that a photopolymerized material is sandwiched as a holographic material between two glass substrates. The refractive indices of the respective parts of the holographic material change depending on the intensity of the incident light, and the aforementioned interference fringes are recorded in the form of refractive index differences.

Figure 2:
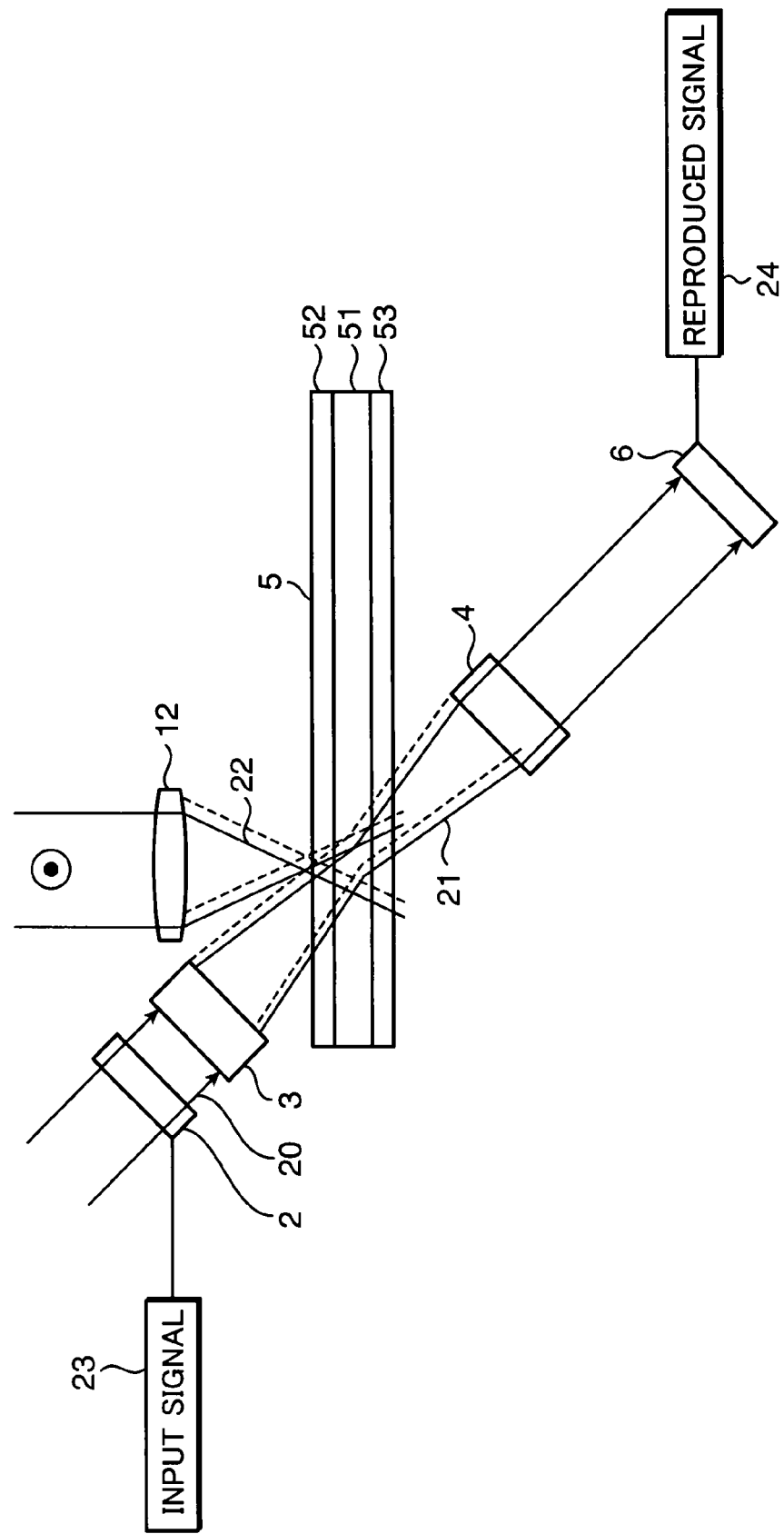
FIG. 2 is a diagram showing a state where holograms are recorded in a multiplexing manner in a holographic disc in the holographic optical information recording/reproducing device shown in FIG. 1.

The feature of the holographic optical information recording/reproducing device as shown in FIG. 1 is that a plurality of holograms can be recorded in a multiplexing manner at the same position in the holographic disc 5, whereby a large recording capacity can be realized. A state where the holograms are recorded in a multiplexing manner in the holographic disc 5 is shown in FIG. 2.

The signal light beam array 20 is condensed into the holographic disc 5 by the lens 3 for recording. At this time, the signal light beam array 20 is modulated in accordance with the input signal and does not have a uniform wavefront. Thus, the signal light beam array 20 forms a beam waist shape having a finite size in the holographic disc 5. On the other hand, the reference light 22 is condensed to the surface of a glass substrate 52 by the condenser lens 12 and crosses the signal light beam array 20 in a photopolymerized material 51. Since monomers are dispersed in the photopolymerized material 51 and are polymerized depending on exposure intensity to be consumed, a density distribution of the monomers is generated. After polymerization, the monomers are diffused (moved) in such a direction as to flatten this density distribution, thereby generating a refractive index distribution.

Figure 3:
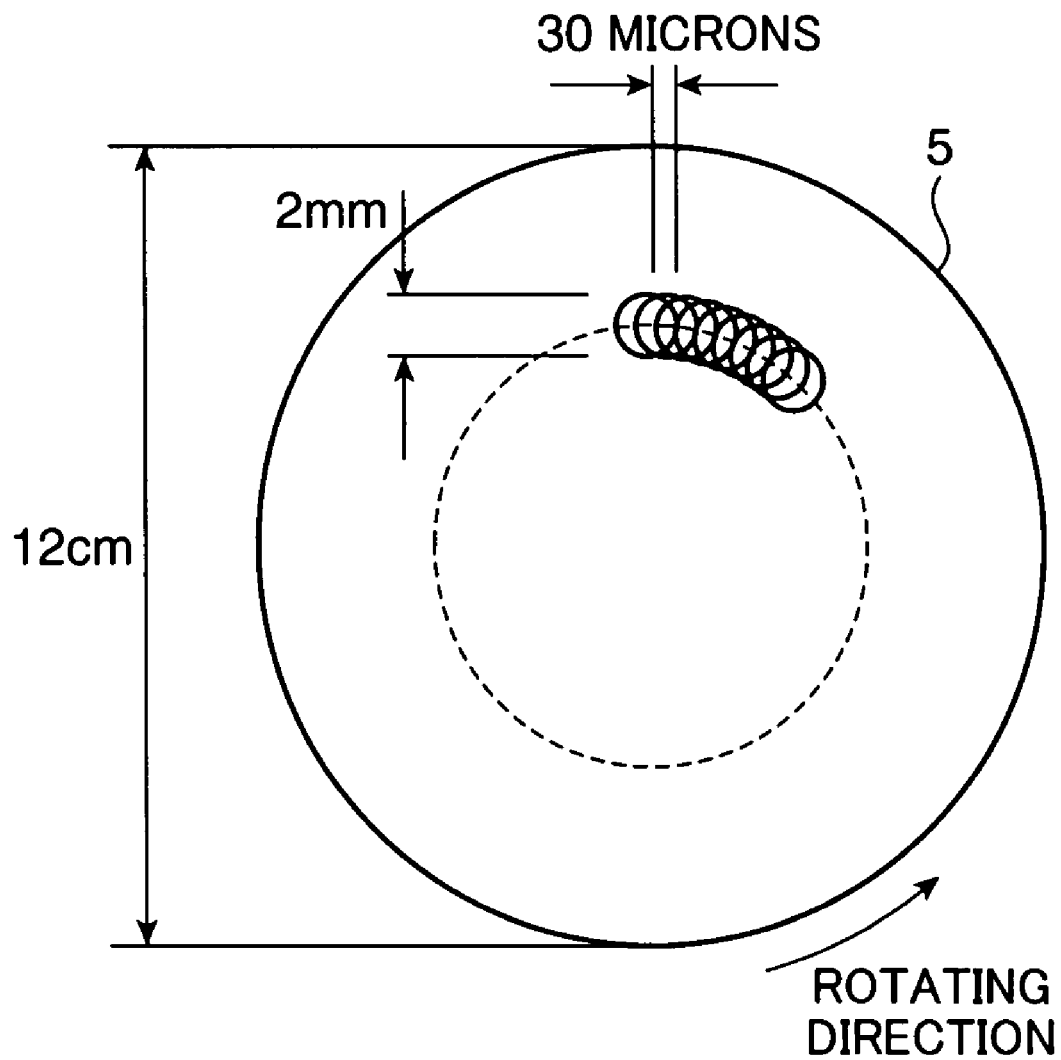
FIG. 3 is a diagram showing a state of the multiplexed holograms in the holographic disc in the holographic optical information recording/reproducing device shown in FIG. 1.

After one hologram is recorded, the holographic disc 5 is slightly moved by rotation and the next hologram is recorded. In FIG. 2, instead of moving the holographic disc 5, the signal light beam array 20 and the reference light 22 to be incident after the movement are shown by dotted line. As shown, the recording areas of the adjacent holograms overlap each other. At this time, the focus position of the reference light 22 differs in the adjacent holograms. Specifically, based on a certain position in the holographic material, the adjacent holograms are recorded at different incident angles of the reference light 22. The configuration of the multiplexed holograms in the holographic disc 5 is as shown in FIG. 3. For example, the holograms are recorded in a multiplexing manner with the hologram size of 2 mm and intervals of about 30 microns between adjacent holograms for multiplexing recording. The holographic disc 5 is rotated every time the hologram is recorded, whereby holograms continuous in a circumferential direction are recorded in a multiplexing manner.

The multiplexing recording of the holograms is performed by controlling an exposure amount within such a range that all the monomers are not polymerized to be consumed. When all the recording is completed, the refractive index difference is fixed by polymerizing the remaining monomers to stabilize the material. This fixing process is not always necessary. If no fixing process is performed, the following problems might possibly occur. Specifically, the remaining monomers are unstable material and change their nature depending on a storage environment to cause an unnecessary refractive index change. Alternatively, unnecessary interference fringes are recorded during the reproduction, thereby generating an unnecessary diffracted light during the reproduction to cause the deterioration of the S/N ratio of the reproduced signal or the like.

The fixing process is performed, for example, by a method of emitting only the reference light 22 to the holographic disc 5 to polymerize the monomers without generating any interference fringes or by a method of successively emitting lights to the entire disc surface, using a light source having low coherency such as a light-emitting diode and provided in the holographic optical information recording/reproducing device.

Upon reproducing the holograms recorded in a multiplexing manner, the signal light beam array 20 is cut off to emit only the reference light 22 to the holograms. Here, the holograms recorded in the photopolymer are in the form of so-called Bragg gratings having the same thickness as the photopolymer. As well known, the thick Bragg gratings have acute dependency on the incident angle of the reference light and generate a reproduced diffracted light only when the reference light is incident at the same angle as the reference light during the recording. As described above, since the incident angle of the reference light 22 sensed by one hologram differs from those sensed by the other holograms in the holographic optical information recording/reproducing device of FIG. 1, it is possible to selectively reproduce one hologram out of the multiplexed holograms.

Here, the feature of the holographic optical information recording/reproducing device according to this embodiment is to increase the power of the reference light 22 upon reproducing the hologram. Specifically, the power of the reference light 22 in the holographic disc 5 (photopolymerized material 51) for information reproduction is preferably greater than a sum of the power of the reference light 22 and that of the signal light 25 (signal light beam array 20) in the holographic disc 5 (photopolymerized material 51) for information recording, more preferably greater than twice this sum. A power ratio of the reference light 22 and the signal light 25 for information recording is preferably 3:1 to 20:1, more preferably greater than 5:1.

Since the reproduced diffracted light from the hologram is generally as low as 1% or even lower, a received light amount by the two-dimensional light receiving element array 6 is small and the ratio of electrical noise included in the reproduced signal becomes relatively large, wherefore the S/N ratio of the reproduced signal is low. In order to ensure a sufficient S/N ratio, it may be thought to ensure a sufficient signal light power by using a light source having a larger output, but this leads to the enlargement and higher cost of the device. A sufficient energy of a reproduced signal light 21 may be ensured by extending a time taken to reproduce one hologram, but the transfer rate decreases in this case.

In the holographic optical information recording/reproducing device of this embodiment, it is possible to eliminate the power distribution to the signal light 25 and to increase the power of the signal light 22 by rotating the half wavelength plate 9 to change the light incident on the polarizing beam splitter 8 into the linearly polarized light in the direction normal to the plane of FIG. 1 at the time of reproducing the hologram. Thus, a sufficient light amount can be ensured in the two-dimensional light receiving element array 6 during the reproduction, wherefore the holograms can be reproduced with a high transfer rate and a high S/N ratio.

In conventional optical disc devices such as CDs and DVDs, it has been necessary to reproduce information with a smaller light power during the reproduction than during the recording so as to reduce data damage caused by a temperature increase of a medium since the information is written by the temperature increase of the medium.

Contrary to this, in the holographic optical information recording technology of recording data by a refractive index change of a photopolymerized material, there is less restriction on the light amount of the reference light. Specifically, monomers hardly exist in photopolymer and the material is not changed by the light irradiation during the reproduction of the recorded medium. Alternatively, since only the reference light is irradiated during the reproduction, no interference fringes are generated and the monomers are uniformly polymerized, wherefore the refractive index difference is not changed. Therefore, even if the power of the reference light is increased, the recorded data are unlikely to be damaged, and the reproduction transfer rate can be increased by increasing the reference light power as in the holographic optical information recording/reproducing device of this embodiment.

Although the half wavelength plate 9 is used as means for controlling the direction of the polarized light to be incident on the polarizing beam splitter 8 in FIG. 1, the same effect can be realized, for example, using a liquid crystal element and changing an application voltage to the liquid crystal element.

Instead of the polarizing beam splitter 8, a polarization hologram may be used and a diffracted light and a transmitted light of the polarization hologram may be used as the signal light 25 and the reference light 22. In this case as well, the half wavelength plate 9 is similarly rotated to control the polarization.

Besides the above method for distributing the power utilizing the polarization of the beam, a half mirror may be disposed at the position of the polarizing beam splitter 8 in FIG. 1 and the distribution ratio of the light beam may be changed by placing this half mirror on and out of a light path. In this case, the number of optical components through which the light beam transmits during the reproduction decreases, thereby fulfilling the effect of reducing the wavefront aberration of the reference light 22.

Another feature of the holographic optical information recording/reproducing device according to this embodiment is that the holograms can be recorded at an optimal power ratio by also controlling the power ratio of the reference light 22 and the signal light 25. Here, an amplitude SLM for modulating the intensity of a light transmitting therethrough in accordance with a signal is used as the spatial light modulating element 2, and the lights incident on the cells corresponding to an OFF data are cut off by the SLM. Thus, the light loss of the signal light 25 is very large. Accordingly, the holographic optical information recording/reproducing device of this embodiment has an effect of improving the light utilization efficiency of the entire device during the recording by distributing a great deal of power to the reference light 22 to reduce a distribution rate to the signal light 25. Therefore, the amount of light emitted to the holographic disc 5 during the recording increases, enabling high-speed recording.

The method for changing the above power distribution ratio is not particularly limited to the above example, and various changes can be made. First, it is preferable to change the power distribution ratio at the time of recording information depending on the recording medium. When the hologram is recorded in the holographic disc 5 as the recording medium, the refractive index of the photopolymerized material 51 is changed in accordance with the light intensity distribution of the interference fringe generated by the signal light 25 and the reference light 22 to record the hologram. At this time, since a maximum refractive index change differs depending on the recording medium, an optimal exposure condition during the recording differs depending on the recording medium. Accordingly, it is preferable to change the above power distribution ratio depending on the kind of the recording medium (e.g. read/write recording medium, write-once recording medium). The above power distribution ratio may be changed depending on the linearity of the recording medium.

It is also preferable to change the power distribution ratio depending on the incident angle of the reference light at the time of recording the information. A method for recording a plurality of holograms at the same position in a multiplexing manner while changing the incident angle of the reference light on the respective holograms is called an angle multiplexing recording. For instance, the incident angle can be changed by deflecting means for deflecting the reference light, e.g. by reflecting the reference light by means of a galvanometer mirror.

Figure 4:
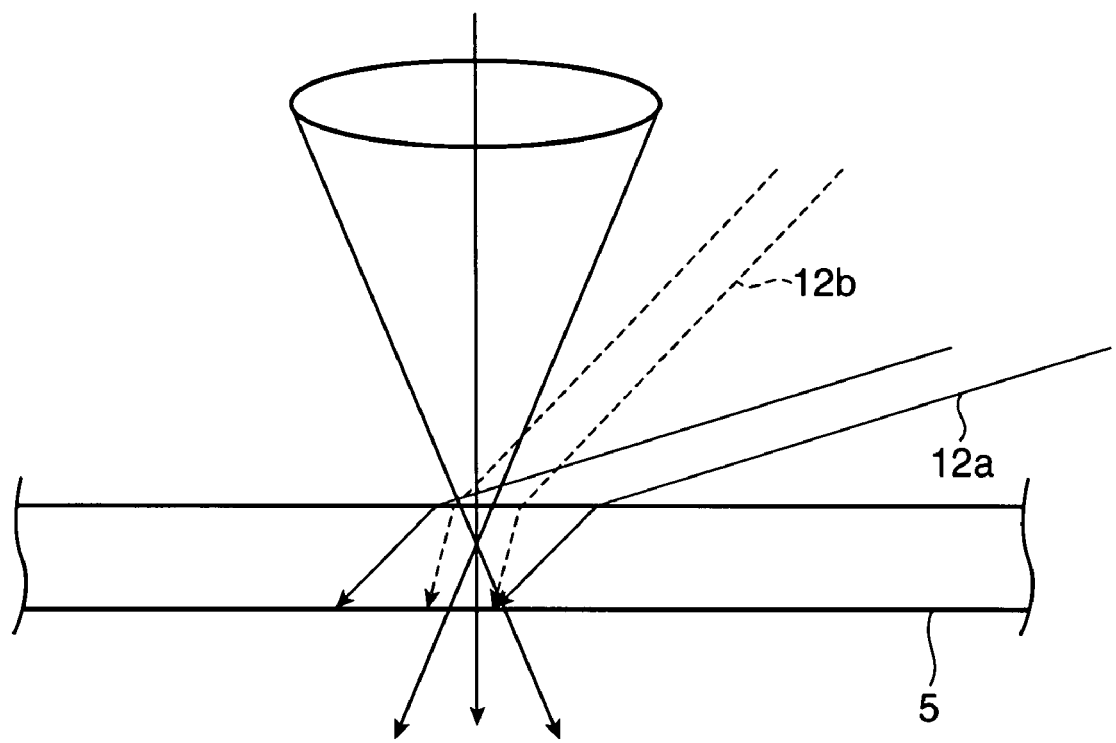
FIG. 4 is a diagram showing a change of a beam intensity of a reference light in the holographic disc depending on an incident angle.

FIG. 4 is a diagram showing a change of the intensity of the reference light in the holographic disc depending on the incident angle. As shown in FIG. 4, when the reference light is incident on the holographic disc 5, the beam intensity of the reference light in the holographic disc 5 changes depending on the incident angle of the beam on the holographic disc 5. Specifically, even if the beam intensities of the reference lights are the same before being incident on the holographic disc 5, the beam size in the holographic disc 5 becomes larger if the incident angle is large (in the case of a reference light 12a shown by solid line in FIG. 4) than if the incident angle is small (in the case of a reference light 12b shown by broken line in FIG. 4), and consequently the beam intensity in the holographic disc 5 becomes lower. When the holograms are recorded in view of this change in the beam intensity, the power of the reference light is made larger than a standard power if the incident angle of the reference light is larger than a standard incident angle and is made smaller than the standard power if the incident angle of the reference light is smaller than the standard incident angle by controlling the rotational position of the half wavelength plate 9 depending on the incident angle of the reference light. As a result, regardless of the incident angle of the reference light, the holograms can be recorded with the intensity ratio, which is the power distribution ratio of the reference light and the signal light, kept constant in the holographic disc 5, whereby the light intensities of the reproduced signal lights from the respective holograms can be made constant.

It is also preferable to change the power distribution ratio at the time of recording the information in accordance with a coding method for coding the information to be recorded in the recording medium. In holographic recording, a digital data as an input signal is recorded by being transformed into a two-dimensional data cell array. Various methods are proposed as the coding method for coding an input data into a data cell array on this occasion.

Figure 5:
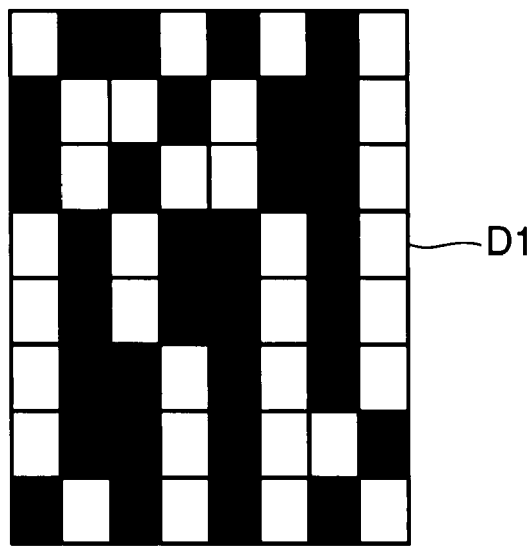
FIG. 5 is a diagram showing 1-2 transform coding method.
Figure 6:
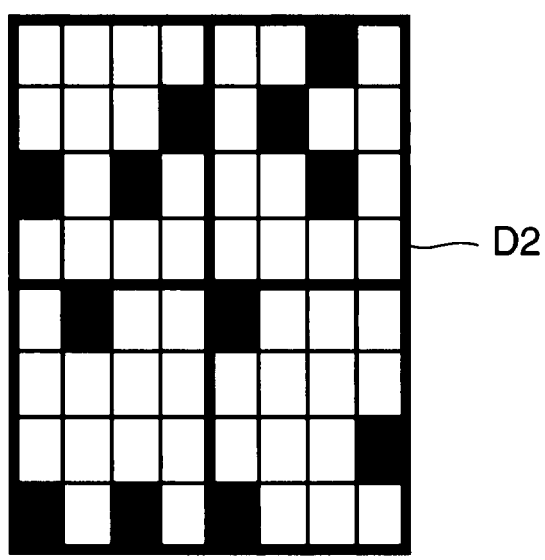
FIG. 6 is a diagram showing 3-16 transform coding method.

FIG. 5 is a diagram showing a 1-2 transform coding method and FIG. 6 is a diagram showing a 3-16 transform coding method. For example, in the 1-2 transform coding method which is a coding method called 1-2 transform, two cells adjacent on the left and right sides are allotted to 1 bit of input data as in a data cell array D1 shown in FIG. 5. If the input data is 1 bit, the right one (black cell in FIG. 5) of the two data cells is turned on and the left data cell (white cell in FIG. 5) is turned off. In this method, regardless of the input data, 50% of all the data cells are turned on and the remaining 50% are turned off.

In the 3-16 transform coding method which is a coding method called 3-16 transform, data cells of a square area (area enclosed by heavy line in FIG. 6) having four cells along each side and comprised of a total of 16 cells are allotted to one byte (=8 bits) of the input data as in a data cell array D2 shown in FIG. 6. Further, arbitrary three data cells are turned on (black cells in FIG. 6) and the remaining 13 cells are turned off (white cells in FIG. 6) for 256 combinations of data of 0 to 255. Since there are more than 256 combinations of selecting three cells out of 16 cells, a 1 byte data can be expressed and 18.75% of all the data cells are turned on and the remaining 81.25% are turned off regardless of the input data in the above method.

The rate of the data cells, which are turned on, differs depending on the coding method. This means that the total transmittance of the spatial light modulating element 2 for generating the signal light changes depending on the coding method, and it is necessary to change the power distribution ratio depending on the coding method of the information to be recorded in the holographic disc 5 in order to realize an optimal power distribution ratio of the reference light and the signal light in the holographic disc 5. For example, in this embodiment, the power distribution ratio of the reference light and the signal light is changed depending on the kind of the recording medium or the area in the case of selecting different coding methods depending on the kinds of the recording media such as write/read recording media, write-once recording media and media having different recording capacities or in the case of selecting different coding methods depending on data areas or data management areas such as FATs (file allocation tables). Specifically, every time the coding method is changed, the rotational position of the half wavelength plate 9 is controlled such that the power of the reference light or the power ratio of the reference light and the signal light increases or decreases in proportion to an inverse of the rate of the data cells turned on in each coding method.

Further, in light of the light utilization efficiency or the power consumption of the holographic optical information recording/reproducing device, the polarizing beam splitter 8 preferably distributes all the light power to the reference light at the time of reproducing the information. In this case, almost all the light from the laser light source 1 is allotted to the reference light by the half wavelength plate 9 that makes the power distribution ratio of the signal light and the reference light variable. However, since extinction ratios by the half wavelength plate 9 and the polarizing beam splitter 8 are finite, it is preferable to simultaneously entirely turn off all the spatial light modulating element 2 arranged on the light path. This can reduce the deterioration of the S/N ratio caused by the superimposition of the little leak light of the signal light propagating along the light path on the reproduced signal light.

It is further preferable to arrange light shielding means such as a shutter in the light path of the signal light and to close the light shielding means during the reproduction of the information in order to cut off the above leak light. This can reduce the deterioration of the S/N ratio caused by the superimposition of the little leak light of the signal light propagating along the light path on the reproduced signal light.

Various light shielding means can be used as the above light shielding means. For example, a mechanical shutter can be used which mechanically places a metal piece as a light shielding member on and out of the light path of the signal light. In this case, the extinction rate is remarkably improved and the deterioration of the S/N ratio can be more reliably avoided. In addition to the mechanical shutter, a liquid crystal element or an optical switch utilizing an electro-optic effect may be used In this case, the extinction rate is lower as compared to the mechanical shutter, but the light path opening and closing operations can be performed at high speed without generating mechanical vibration since no movable portion exists.

Second Embodiment

Figure 7:
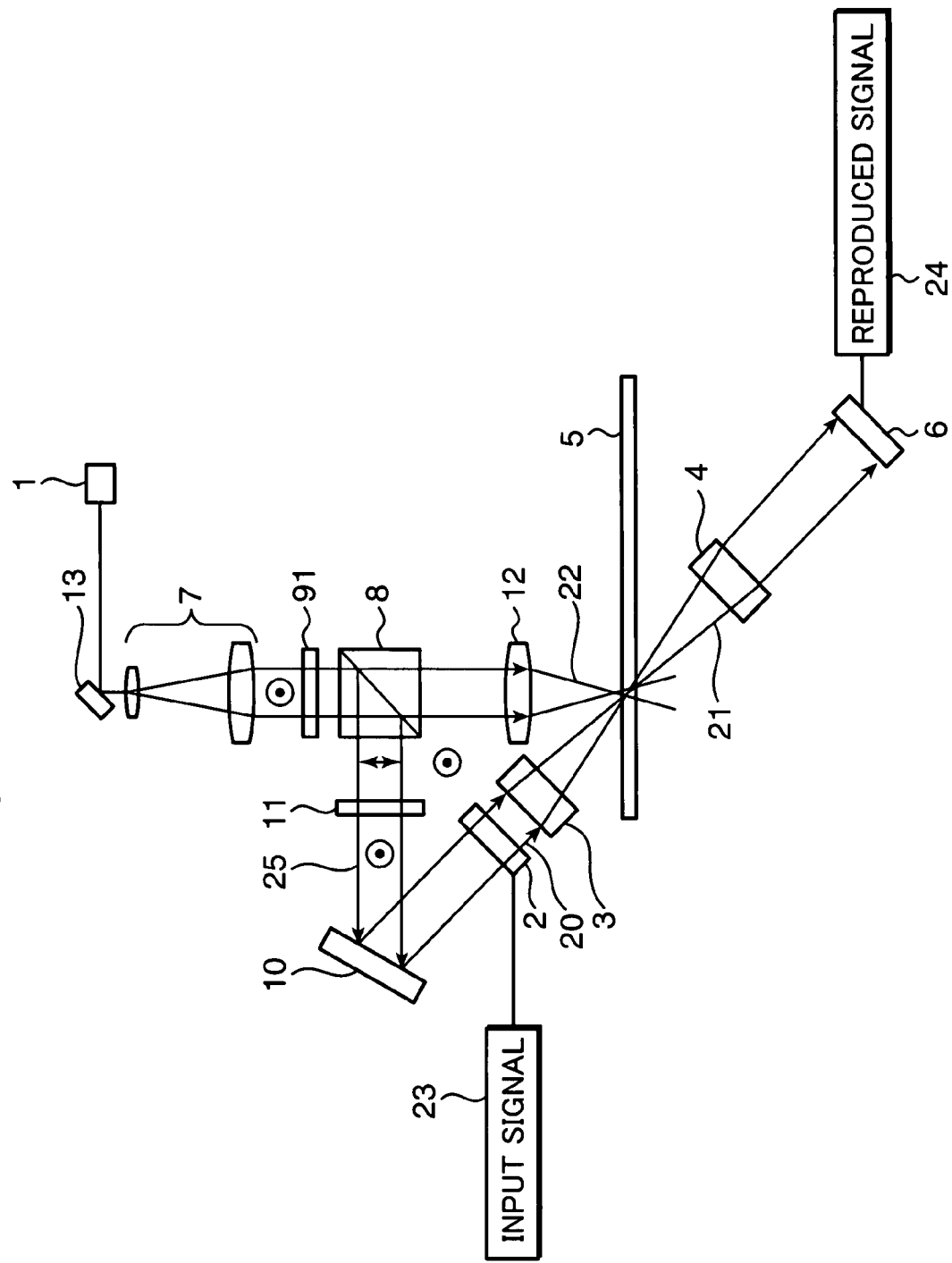
FIG. 7 is a schematic construction diagram showing a holographic optical information recording/reproducing device according to a second embodiment of the invention.

FIG. 7 is a schematic diagram of a holographic optical information recording/reproducing device according a second embodiment of the present invention. A characteristic feature of the holographic optical information recording/reproducing device of FIG. 7 is that a polarization controlling device for controlling the power distribution ratio of a signal light and a reference light includes an EO modulator 91. The EO modulator 91 has a feature of being operable at high speed. Another characteristic feature of the holographic optical information recording/reproducing device is that one hologram is reproduced immediately after this hologram is recorded. The procedure of recording the hologram is as follows.

Upon recording a hologram, a reference light 22 and a signal light 25 are simultaneously irradiated to a holographic disc 5. At this time, a two-dimensional light receiving element array 6 is irradiated with the signal light 25 having transmitted through a spatial light modulating element 2. Subsequently, after the lapse of a time to reach a target exposure amount, only the reference light 22 is irradiated to the holographic disc 5 by changing an application voltage to the EO modulator 91 so as to output a linearly polarized light perpendicular to the plane of FIG. 7. At this time, a diffracted light from the hologram recorded immediately before is incident on the two-dimensional light receiving element array 6 as a reproduced signal light 21. At the same time the signal light 25 is cut off by changing the application voltage to the EO modulator 91, light charges accumulated in the respective cells of the two-dimensional light receiving element array 6 are discharged for reset. Subsequently, after reproducing the hologram for a specified time, an amount of electric charges accumulated in the two-dimensional light receiving element array 6 by photoelectric conversion is read out from the two-dimensional light receiving element array 6. By the above procedure, high-speed verification can be realized by reading the data recorded in the hologram out immediately after the recording.

It is also possible to monitor the diffraction efficiencies of the recorded holograms by the above method. Upon recording the holograms in a multiplexing manner, it is quite important to monitor the diffraction efficiencies of the respective holograms in order to ensure sufficient S/N ratios of the respective holograms by equally allotting the dynamic range of the material to the individual holograms.

Although the signal light is cut off by the EO modulator 91 immediately after the recording of the hologram as described above, a similar operation can also be realized by light shielding means arranged on a light path of the signal light for shielding the signal light such as the arrangement of a high-speed optical switch on the light path of the signal light or the turning-off of all the switches of the spatial light modulating element 2.

In the above method, a time during which the EP modulator 91 sets a power distribution ratio such that the reference light and the signal light are incident on the holographic disc 5 to record the hologram at the time of recording information is preferably longer than a time during which the EO modulator 91 changes the power distribution ratio such that all the light power is distributed to the reference light to reproduce the hologram after the recording of the information, i.e. the reproducing time immediately after the recording is preferably shorter than the hologram recording time. This has an effect of suppressing a drop in the dynamic range of the recording material due to the advancement of the polymerization of monomers by the reproduction. For the same reason, the exposure amount during the reproducing time is preferably smaller than the exposure amount during the recording time.

In the above method, there are cases where a refractive index change occurs after the lapse of a specified time after the exposure or the refractive index change ends after the lapse of a specified time after the exposure as in the case where a photopolymerized material is used as the holographic material. Thus, it is preferable to perform the verification or to monitor the diffraction efficiencies after the lapse of the specified time after the recording. This has an effect of enabling more accurate verification and monitoring of the diffraction efficiencies.

Although the shift multiplexing holographic optical information recording/reproducing device using the spherical wave as the reference light is described above, effects similar to the above can be obtained even with a holographic optical information recording/reproducing device based on another multiplexing method. For example, similar effects can be obtained even with a shift multiplexing method using a reference light forming a speckle pattern. Although different holograms are recorded at different positions in these shift multiplexing methods, it is preferable, upon performing the verification or the monitoring of the diffraction efficiency as described above, to keep the relative positional relationship of an optical head and a holographic disc in such a manner as not to substantially change from the start of the recording of the hologram to the end of the verification or the monitoring of the diffraction efficiency, i.e. to keep the relative positional relationship of the reference light and the recording medium in such a manner as not to move longer than a specified distance during the period in which the EO modulator 91 changes the power distribution ratio to distribute all the light power to the reference light and the hologram are reproduced.

For example, a change in the relative positional relationship is preferably kept at or below ⅕ of a cycle of interference fringes being recorded. If the interference fringe cycle is 0.5 microns, the relative positional relationship may be so kept as not to change larger than about 0.1 micron. In such cases, there is an effect of preventing a drop in the contrast of the interference fringes being recorded by the change of the relative positional relationship.

In order to satisfy the above condition, the holographic disc 5 may be stopped upon recording each hologram, the verification or the monitoring of the diffraction efficiency may be finished while the holographic disc 5 is stopped, and an adjacent hologram may be recorded after the disc is moved a specified distance. Alternatively, the recording and the verification may be performed using a short pulsed light while the holographic disc 5 is moved at a specified speed. For example, when holograms having an average interference fringe cycle of 0.5 microns are recorded while a holographic disc is moved 30 mm/second, a time from the start of the recording of the hologram to the end of the verification may be about 5 microseconds.

The above verification method is more effectively carried out in a multiplexing holographic optical information recording/reproducing device for recording a plurality of holograms at the same position as by the angle multiplexing method. This has an effect of reducing restriction on the pulse duration of the light source and the time until the end of the verification that is the case with the shift multiplexing method since the holographic disc needs not be moved while a plurality of holograms are recorded.

The monitoring of the diffraction efficiency after the recording, i.e. the detection of the diffraction efficiency of the recorded hologram for a period during which the EO modulator 91 changes the power distribution ratio to distribute all the light power to the reference light after the recording of the information has the following effect. The holographic recording material has a possibility that the polymerization of monomers proceeds before the recording to reduce remaining monomers because of being exposed to high temperature for a long time or exposed to environment light. On such an occasion, the total refractive index change caused by the hologram recording decreases. If holograms are recorded in such a performance-degraded holographic disc at a proper exposure amount for a holographic disc free from performance degradation, there is a possibility that the monomers run out during the multiplexing recording and holograms are not properly recorded at a later stage.

This can be prevented by the following methods. A first method is such that the diffraction efficiencies from recorded holograms are monitored, the recording is performed at such an exposure amount that the diffraction efficiencies of the respective holograms show proper values, and the multiplexing of the holograms is stopped before it becomes impossible to obtain a sufficient diffraction efficiency because of the shortage of monomers. This method has a disadvantage that a degree of multiplexing becomes smaller than a proper value to reduce the capacity of the entire holographic disc while having an advantage that a proper transfer rate can be realized since the diffraction efficiencies from the respective holograms take suitable values and sufficient reproduced light amounts can be obtained.

The first method can also be realized by monitoring the diffraction efficiencies from the respective holograms while the holograms used for data recording are recorded. Since the diffraction efficiencies of the data holograms themselves are monitored in this case, there is an effect of being not influenced by a distribution of degradation degree in a plane of the holographic disc. This method can be also realized by recording holograms in a multiplexing manner in a control area different from a data area before performing the data recording and by determining a degree of multiplexing in the data area through the monitoring of the reproduction diffraction efficiency and the reproduction S/N ratio of these holograms. In this case, there is an effect of recording the holograms at high speed without monitoring the diffraction efficiencies after the degree of multiplexing is determined once.

The above degree of multiplexing can be adjusted by changing hologram recording intervals on the disc in shift multiplexing holographic optical information recording/reproducing devices while being adjusted by changing the incident angle intervals of the reference light at the time of recording holograms in angle multiplexing holographic optical information recording/reproducing devices.

Next, a second method is such that the diffraction efficiencies from recorded holograms are monitored and diffraction efficiencies are allotted to the respective holograms so as to obtain a desired degree of multiplexing to adjust an exposure amount. For example, refractive index changes in the respective holograms are made smaller if the material is deteriorated to decrease the total refractive index change. This method has an advantage that a suitable degree of multiplexing is obtained to ensure a sufficient capacity of the entire holographic disc while having a disadvantage that a proper transfer rate cannot be realized due to a decrease in the diffraction efficiencies from the respective holograms.

The second method can be also realized by monitoring the diffraction efficiencies from the respective holograms while recording the holograms for data recording as described above. Since the diffraction efficiencies of the data holograms themselves are monitored in this case, there is an effect of being not influenced by a distribution of degradation degree in a plane of the holographic disc. This method can be also realized by recording holograms in a multiplexing manner in a control area different from a data area before performing the data recording and by determining a degree of multiplexing in the data area through the monitoring of the reproduction diffraction efficiency and the reproduction S/N ratio of these holograms. In this case, there is an effect of recording the holograms at high speed without monitoring the diffraction efficiencies after the degree of multiplexing is determined once.

Next, a third method is such that the recording is stopped if no proper diffraction efficiency was obtained from a recorded hologram. This method has a disadvantage of being unable to perform the data recording while having an advantage that there is no difference between the actually recorded data and the recording capacity and the transfer rate associated with the kind of standard written on the holographic disc, the kind of standard written on a disc package, or the kind of standard written on a disc cartridge.

Next, a fourth method is such that a warning is given or a warning signal is outputted if no proper diffraction efficiency was obtained from a recorded hologram. In this case, there is an effect of being unlikely to have a difference between the actually recorded data and the recording capacity and the transfer rate associated with the kind of standard written on the holographic disc, the kind of standard written on a disc package, or the kind of standard written on a disc cartridge.

These first to fourth methods are not limited to the application to the holographic recording, and similar methods are also applicable to the conventional optical disc technology of recording marks by focusing microspots on a recording film surface. Such similar methods include, for example, a method according to which refractive index changes of recorded marks are monitored, and marks are recorded with an elongated average length or reproduced at a reduced disc speed if there is no sufficient refractive index change. However, the first to fourth methods are particularly effective when being applied to the holographic recording since holographic recording materials are likely to change their nature with time and likely to be exposed to environment light as described above, thereby having properties not inherent to conventional optical disc materials.

Third Embodiment

If being left unexposed, a holographic material might experience problems that a reaction, different from a chemical reaction undergone during actual exposure, due to ambient environmental temperature, whereby the material is blackened to increase scattering and the like. In order to prevent this, it is useful to irradiate unexposed parts of the material with light to consume the unreacted material when no more information is written after the recording, i.e. the disc is closed. This is called a fixing process.

In the first embodiment, the refractive index differences are fixed by polymerizing all the remaining monomers when the entire recording is completed, and the holographic disc 5 can be irradiated with the light with a power density larger than the one used during the recording at the time of fixing the holograms. For example, during the fixing process, the monomers in the recording material are already polymerized by being consumed by the holographic recording and the monomer concentration is low. At this time, distances between monomer molecules are large. If the activation frequency of a polymerization initiator is small in this state, the efficiency of the polymerization initiation by the activation of the polymerization initiator decreases, thereby causing a phenomenon where the monomers are not sufficiently polymerized while only the polymerization initiator is consumed. In other words, sensitivity is likely to exhibit nonlinearly. In order to prevent this, it is preferable to irradiate the holographic material with a light with a greater power density particularly in a fixing process in which a drop in the concentration of monomers is notable. In the first embodiment, the power density greater than the one during the recording can be realized by allotting all the light from the laser light source 1 to the reference light to eliminate the light loss in the spatial light modulating element 2 on the light path of the signal light.

The above fixing process is particular important in an unsaturated area where multiplexing recording is performed to a certain degree, but has not reached a maximum degree of multiplexing yet. If the material is blackened in this unsaturated area, the scattered light is induced upon the signal reproduction, thereby resulting in a reduced S/N ratio. Contrary to this, in an unrecorded area where no recording has been made yet, the blackening of the unexposed material does not become a large problem since there is no likelihood of signal reproduction. Accordingly, the fixing process needs not be performed in all the areas, but is preferably performed only in the unsaturated area. In this case, a time required for the fixing process can be reduced, whereby the recording can be more quickly finished.

In the holographic material, the unexposed part has a low viscosity. If the recording is made in a part of the holographic disc and the other part of the holographic disc is left unexposed, it might possibly bring about adverse effects of, e.g. changing the refractive index or volume of the recorded area or increasing the scattering in the recorded area due to the diffusion of chemical substances in the unexposed area to the recorded part. Upon the recording in such a holographic material, it is preferable to apply the fixing process to all the unrecorded areas and unsaturated area.

Upon the multiplexing recording, the unreacted material remains even if the multiplexing recording is performed at a maximum degree of multiplexing in the respective areas of the holographic disc. This is to obtain a specified sensitivity by ensuring a specified amount of unreacted material even just before the end of the multiplexing recording. Thus, upon using a material that is blackened to a relative large degree when an unreacted material is left for a long time, it is preferable to apply the fixing process to all the unexposed areas, unsaturated areas and recorded areas when the recording is ended.

Of course, even if the construction of the first embodiment is not adopted, the power density greater than the one during the recording may be realized by preparing a separate light source used for the fixing process. By performing the fixing process at the power density greater than the one during the recording in this way, there are an effect of more completely polymerizing the actually consumed monomers and also an effect of completing the fixing process within a shorter period of time.

Figure 8:
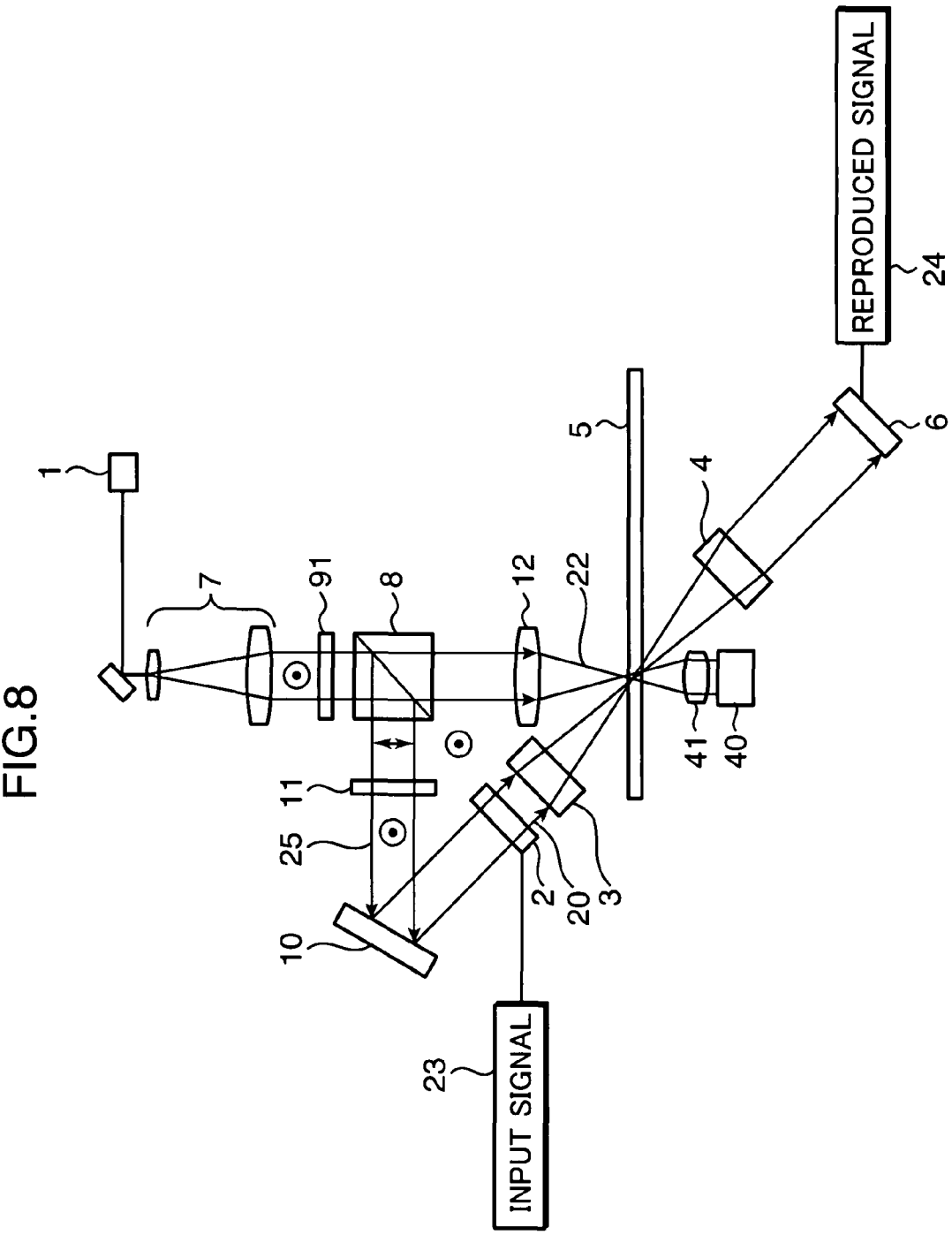
FIG. 8 is a schematic construction diagram showing a holographic optical information recording/reproducing device according to a third embodiment of the invention.

FIG. 8 is a schematic diagram of a holographic optical information recording/reproducing device according the third embodiment of the present invention. A characteristic feature of this embodiment is that a light-emitting diode 40 is used as a fixing light source after the holographic recording and only an unsaturated part is fixed by condensing a light from the light-emitting diode 40 by an objective lens 41. The light-emitting diode 40 has an emission spectrum center at a wavelength substantially equal to or slightly shorter than that of a laser light source 1 as a recording light source, so that remaining monomers are efficiently polarized when an output light is incident on a holographic material.

The effect of this embodiment is no deterioration of the S/N ratio during the reproduction by the fixing process since any unnecessary interference fringe is not formed by the fixing process and no unnecessary diffracted light is produced during the reproduction. The spectrum width of the light-emitting diode 40 is equal to or larger than about 10 nm, and no interference fringes are formed even if unnecessary reflected lights and other stray lights are produced at interfaces of the holographic disc 5. It is preferable that the light source used in the fixing process has a wider spectrum width that the light source for recording. Although the light-emitting diode 40 is used for fixing in FIG. 8, another light source can also be used provided that the emission spectrum thereof is equal to or larger than 1 nm and the emission spectrum center thereof lies within the sensitivity range of the holographic material. For example, a superluminescent diode may be used.

Although the fixing light source emits a light from below the holographic disc 5 in the above description, it may emit a light from above or sideways. Particularly if a light is emitted sideways, the light from the fixing light source travels a long distance in the holographic material, wherefore the material can be more efficiently fixed. In this case, there is an effect of shortening a time for the fixing process. Another effect is that it is sufficient for the fixing light source to have a small output. When the holographic disc 5 is irradiated with the light emitted sideways from the fixing light source, the fixing light source may be brought close to an end surface of the holographic disc 5 or to focus the light on the end surface of the holographic disc 5 via a condenser optical system. In either case, light utilization efficiency is improved to bring about an effect of shorting a fixing time and an effect of a smaller output of the fixing light source.

Also in the case of fixing the material using the laser light source 1 for recording, the action length of the light and the holographic material becomes longer by increasing the incident angle on the holographic disc 5, whereby the fixing process can be made more efficient. Alternatively, even in the case where a separate light source having a wider spectrum width is not used as in FIG. 8, if the semiconductor laser is used, for example, as the recording light source, the spectrum width of the light source in the fixing process can be similarly enlarged by enlarging the spectrum width to reduce coherency through the superimposition of a high-frequency current on an injection current of the semiconductor laser. In this case as well, there is an effect of no deterioration of the S/N ratio during the reproduction by the fixing process since no unnecessary interference fringes are formed by the fixing process and no unnecessary diffracted lights are produced during the reproduction.

Fourth Embodiment

Since the two-dimensional reproduced signal light beam array is detected by the two-dimensional light receiving element array 6 in the holographic optical information recording/reproducing device as described above, it is necessary to align the positions of the reproduced beam array with those of the cells of the two-dimensional light receiving element array 6. Particularly, when information recorded in a holographic disc by a certain holographic optical information recording/reproducing device is reproduced by another holographic optical information recording/reproducing device, the image sizes of the lenses of both devices need to be strictly conformed. For example, if the reproduced signal lights and the cells of the two-dimensional light receiving element array 6 are, for example, arrayed in a square pattern of 1000 in vertical direction and 1000 in horizontal direction, halves of the adjacent reproduced signal lights are incident on the cells at end parts of the two-dimensional light receiving element array 6 when the image size of the lens of the recording device and that of the lens of the device for reproducing the information recorded in the holographic disc differ by 0.1%. Thus, correct signal reproduction cannot be performed. Such a situation can possibly occur not only in the case where information is reproduced by a different holographic optical information recording/reproducing device as described above, but also in the case of distortions of the lenses caused by an environmental temperature change or a change with time, the thermal expansion of the two-dimensional light receiving element array 6 caused by a temperature change or a combination of these.

In view of this problem, the hologram optical information recording/reproducing device of this embodiment includes a reproduction lens having a variable magnification, i.e. a various focal length, instead of the reproduction lens 4 in the construction of the hologram optical information recording/reproducing device shown in FIG. 1. In this construction, the positions of the reproduced signal lights and those of the cells of the two-dimensional light receiving element array can be easily aligned by adjusting the magnification of the reproduction lens in accordance with the entire image size of the reproduced signal light beam array, thereby enabling precise signal reproduction. Since the construction of the hologram optical information recording/reproducing device according to this embodiment is similar to that of the hologram optical information recording/reproducing device shown in FIG. 1 except the above point, it is neither shown nor described in detail.

The hologram optical information recording/reproducing device of this embodiment preferably includes the reproduction lens having a variable magnification and the two-dimensional light receiving element array in which a greater number of light receiving cells than the reproduced signal light beams are arrayed in an area larger than the size of the reproduced signal light beam array. In this construction, the entire image size of the two-dimensional reproduced signal light beam array can be known by applying image processing to the output signals from the two-dimensional light receiving element array 6 both in the case where the entire image size of the two-dimensional reproduced signal light beam array becomes larger than a desired image size or in the case where it becomes smaller than the desired image size. By more suitably adjusting the magnification of the reproduction lens, the positions of the reproduced signal light beams and those of the light receiving cells of the two-dimensional light receiving element array can be more easily aligned, thereby enabling more precise signal reproduction.

The light receiving cells on an outer peripheral part of the two-dimensional light receiving element array are preferably area-divided. In this case, a magnification error can be more accurately recognized based on the output signals from the light receiving cells on the outer peripheral part of the two-dimensional light receiving element array, whereby the magnification can be more accurately adjusted and the signal can be more precisely reproduced.

Further, the hologram optical information recording/reproducing device of this embodiment preferably includes a recording lens having a variable magnification, i.e. a various focal length, instead of the recording lens 3 in the construction of the hologram optical information recording/reproducing device shown in FIG. 1. In this construction, a hologram for generating a reproduced image of a suitable size can be recorded by adjusting the magnification of the recording lens even if it becomes impossible to record the hologram for generating the reproduced image of the suitable size due to the distortion of the recording lens.

It is also possible to use the above recording lens having a variable magnification and the two-dimensional light receiving element array in which a greater number of light receiving cells than the reproduced signal light beams are arrayed in a range larger than the size of the reproduced signal light beam array. In this construction, the entire image size of the two-dimensional reproduced signal light beam array can be known by letting the two-dimensional light receiving element array detect $0^{th}$-order lights not to be diffracted by the hologram out of the signal light having transmitted through a spatial light modulating element and applying image processing to the output signals from the two-dimensional light receiving element array. By more suitably adjusting the magnification of the reproduction lens, the positions of the reproduced signal light beams and those of the light receiving cells of the two-dimensional light receiving element array can be more easily aligned, thereby enabling more precise signal reproduction. In this case as well, a magnification error can be more accurately recognized based on the output signals from the light receiving cells on the outer peripheral part of the two-dimensional light receiving element array, whereby the magnification can be more precisely adjusted and the signal can be more precisely reproduced.

In the construction of this embodiment, the recording lens and the reproduction lens preferably have substantially the same distortion. In the holographic optical information recording/reproducing device, so-called Fourier transform lens expressed by such a relationship that an image height $h=f \times \sin \theta$ when $\theta$, $f$ denote the incident angle of the beam and the focal length are used as the recording lens and the reproduction lens. At this time, a reproduced signal light spot array free from distortion can be obtained, and all the reproduced signal light spots are arrayed at equal intervals in a square area. On the other hand, if the reproduction lens or the recording lens has a distortion, the intervals of the reproduced signal light spots near a central image differ from those near a peripheral image, whereby the positions of the light receiving cells of the two-dimensional light receiving element array and those of the reproduced signal light spots do not coincide, leading to the degraded quality of the reproduced signal.

Contrary to this, according to the above construction, aberration influences during the recording and during the reproduction cancel out each other since the reproduction lens and the recording have substantially the same distortion. As a result, the reproduced signal light spot array having equal intervals can be obtained by reproducing the hologram recorded using the spatial light modulating element having equal intervals, wherefore the reproduced signal light spot array can be detected by the two-dimensional light receiving element array having equal intervals to obtain a high-quality reproduced signal.

If a Fourier transform lens is strictly designed, it is necessary to use many constituent lenses to reduce a distortion, therefore having problems of being expensive, heavy and large in size. On the other hand, in the construction using the recording lens and the reproduction lens having substantially the same distortion as described above, there is more freedom in designing the lenses. Thus, there are advantages of reduced numbers of constituent lenses, lower costs of the lenses, lighter weights and smaller sizes.

In a construction including a recording lens and a reproduction lens both having barrel-shaped distortions, there is more freedom in designing the lenses as compared to a construction including those having bobbin-shaped distortions. Thus, there are advantages of a reduced number of constituent lenses, lower costs, lighter weights and smaller sizes of the lenses.

The field curvatures of the recording lens and the reproduction lens are preferably small, for example, smaller than a focal depth. If the field curvatures are large, the focus positions of reproduced signal light spots differ depending on the positions on the two-dimensional light receiving element array and the light spot size becomes larger. Thus, intersymbol interference increases. For example, if the wavelength of the laser light source is 532.1 nm, the cell size of the spatial light modulating element is 15 microns and the focal lengths of the recording lens and the reproduction lens are 20 mm, the focal depth is about 0.1 mm and the field curvatures are preferably 0.1 mm or smaller.

Each of the field curvatures of the recording lens and the reproduction lens is preferably half the focal length. Normally, it is sufficient to set the field curvatures equal to or smaller than the focal depth as described above. However, in the hologram optical information recording/reproducing device, if both the recording lens and the reproduction lens have field curvatures, the influences thereof are added, wherefore it is better to set the field curvatures of the respective lenses further smaller. By specifying the field curvatures of the recording lens and the reproduction lens to be respectively equal to or smaller than half the focal depth, both lenses can be similarly designed, thereby providing an additional effect of standardizing parts and reducing costs.

As described above, focal blur at the time of reproducing the signal can be prevented by specifying the focal lengths of the recording lens and the reproduction lens and the cell size of the spatial light modulating element and setting them equal to or below half the focal depth determined from the wavelength of the laser light source as described above. It should be noted that the constructions of the above recording lens, the reproduction lens and the spatial light modulating element may be individually implemented.

Fifth Embodiment

Figure 9:
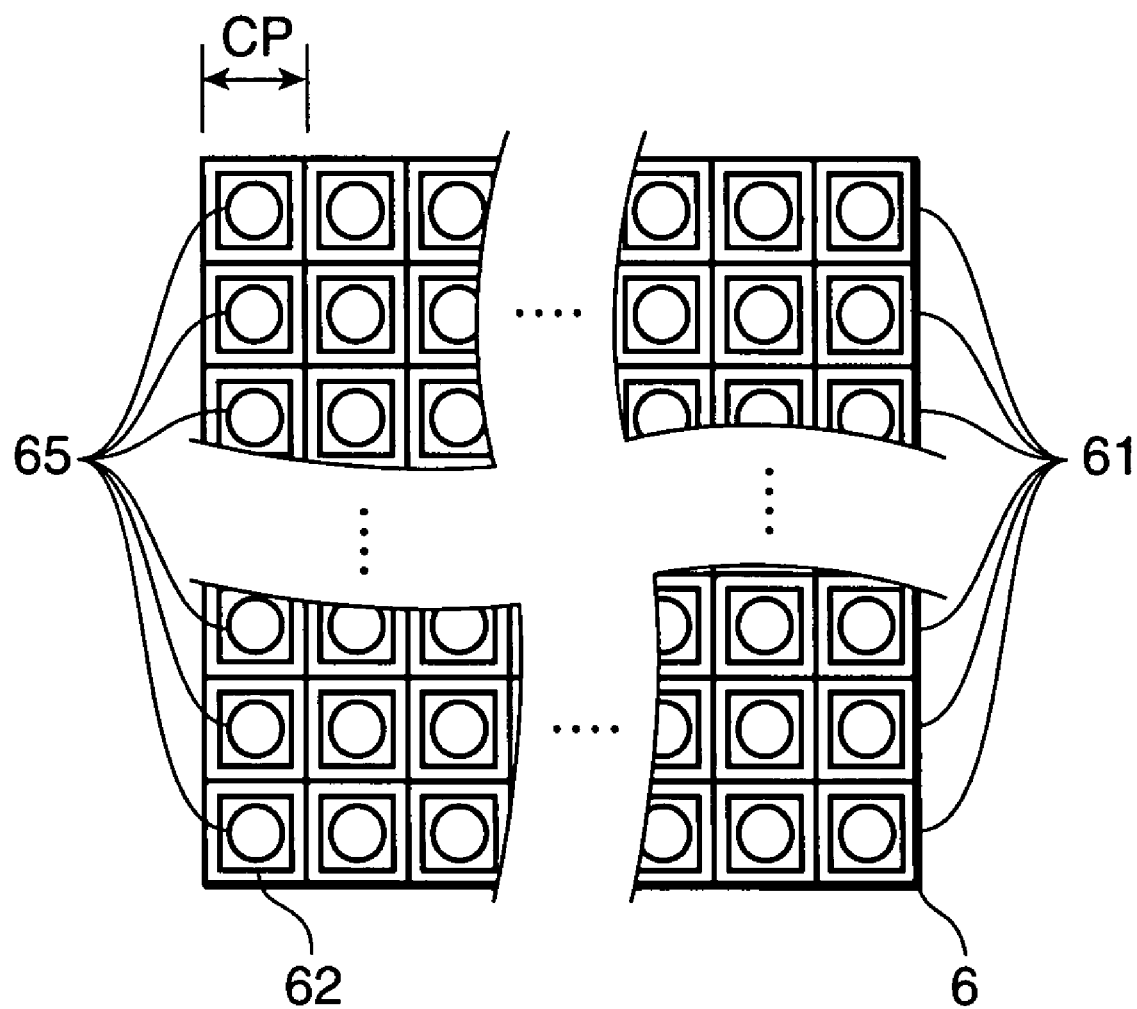
FIG. 9 is a schematic optical construction diagram of a two-dimensional light receiving element array used in a holographic optical information recording/reproducing device according to a fifth embodiment of the invention.

FIG. 9 is a schematic optical construction diagram of a two-dimensional light receiving element array used in a holographic optical information recording/reproducing device according to a fifth embodiment of the present invention. A characteristic feature of this embodiment is that the size of a two-dimensional light receiving portions 62 (vertical and horizontal lengths of the light receiving portions 62) of the respective cells of a light receiving element array 6 is smaller than a cell pitch CP (vertical and horizontal lengths of light receiving cells 61). Since the construction of the holographic optical information recording/reproducing device according to this embodiment is similar to the one shown in FIG. 1 except the two-dimensional light receiving element array 6 shown in FIG. 9, it is neither shown nor described in detail.

Figure 10:
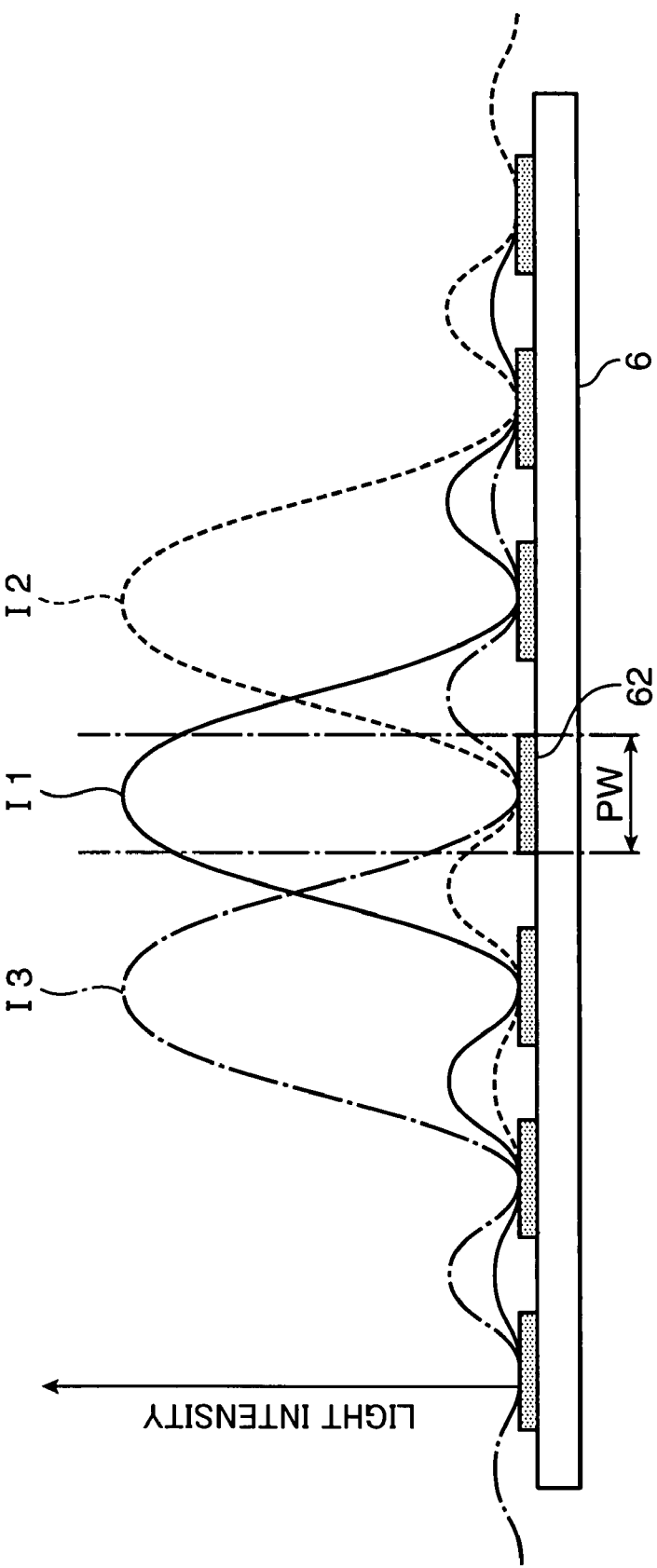
FIG. 10 is a conceptual section showing a state where the two-dimensional light receiving element array shown in FIG. 9 is receiving reproduced signal light spots.

FIG. 10 is a sectional conceptual diagram showing a state where the two-dimensional light receiving element array shown in FIG. 9 is receiving reproduced signal light spots. Although reproduced signal light spots 65 are expressed by circles in FIG. 9, actually reproduced signal light spots show a light intensity distribution as shown by a solid-line curve I1 in FIG. 10. FIG. 10 shows a case where the positions of reproduced signal light spot arrays and those of the cells of the two-dimensional light receiving element array 6 precisely coincide, and the light intensity distributions of the reproduced signal light spots reach maximum values in the center of the corresponding light receiving portions 62 of the two-dimensional light receiving element array 6.

The light intensity distributions of the reproduced signal light spots have spreads as shown in FIG. 10 mainly because the recorded hologram is diffracted based on the size thereof since the size thereof is restricted. If the shape of hologram is square or rectangular and a reproduced signal light is diffracted with the same equal diffraction efficiency from the respective parts in the hologram, the light intensity distribution of the light spot shown in FIG. 10 is expressed by a function of the square of a sinc function. The spread of the light intensity distribution at this time depends on the size of the hologram and, by suitably selecting the size of the hologram, the positions of the first and second nulls of the light intensity distribution can precisely conform to the light receiving portions 62 of the adjacent light receiving cells 61 as shown in FIG. 10.

An output signal of each light receiving cell 61 is a value proportional to an integral value of the light intensity distribution on the light receiving portion 62. As shown by a curve I2 or I3 in broken line or dashed line in FIG. 10, parts of the adjacent light spots in an ON state are incident on the light receiving portion 62 to change the light intensity of the reproduced signal light from the cell. This is a phenomenon similar to intersymbol interference that occurs by the incidence of diffracted lights from adjacent pits on a light receiving element in a conventional optical disc. In a conventional optical disc reproducing device, this intersymbol interference is taken into account and a reproduced signal is caused to pass a suitable FIR filter, whereby the influence of the intersymbol interference can be reduced.

On the other hand, a characteristic feature of the intersymbol interference in holographic optical information recording is that lights from adjacent light spots and a reproduced signal light coherently interfere. If the lights from the adjacent light spots and the reproduced signal light coherently interfere, the magnitude of the intersymbol interference does not have linearity. Specifically, in a reproduced signal of a certain cell, the magnitude of the intersymbol interference from adjacent spots differs depending on the number of adjacent cells in an ON state. Further, the magnitude of the intersymbol interference from adjacent spots also differs depending on whether this certain cell is in an ON state or in an OFF state. Thus, the intersymbol interference cannot be effectively reduced using such an FIR filter as used in the conventional optical disc reproducing device. For the above reasons, the intersymbol interference is effectively reduced by reducing lights from adjacent spots incident on the light receiving cells 61 by means of optical means in the holographic optical information recording/reproducing device.

To this end, the size (PW shown in FIG. 10) of the light receiving portions 62 of the two-dimensional light receiving element array 6 is made smaller than the cell pitch CP in the holographic optical information recording/reproducing device of this embodiment. As shown in FIG. 10, the light intensities of lights from adjacent spots are low in a middle part of the light receiving portion 62 while being high in end areas of the light receiving portion 62. By making the light receiving portions 62 smaller, the incidence of the lights from the adjacent spots can be effectively reduced.

In order to further reduce the magnitude of the intersymbol interference, it is preferable to superimpose a pseudo random diffuser on a spatial light modulating element 2. The pseudo random diffuser is for displacing the phase of signal light spots of adjacent cells by $\pi/2$. Even if the reproduced signal light spot of an arbitrary cell and reproduced signal lights of adjacent cells incident on the arbitrary cell interfere, the light intensity distribution in the light receiving portion 62 is expressed by a sum of the light intensities of the respective light spots. Thus, the influence of the intersymbol interference can be efficiently reduced using an FIR filter.

Also in the case of using the pseudo random diffuser, a phase difference between lights incident on the cell are not $\pi/2$ if there are a plurality of adjacent spots in an ON state, wherefore nonlinear intersymbol interference remains. This nonlinear intersymbol interference occurs by the interference of the light intensity of the spot light of the adjacent cell on the right side of the middle cell and that of the light spot of the adjacent cell on the left side in the example of FIG. 10. In other words, it occurs by the interference of the broken-line curve I2 and the dashed-line curve I3 in FIG. 10.

Since the distributions shown by the broken-line curve I2 and the dashed-line curve I3 both show low light intensities in the middle part of the light receiving portion 62 and high light intensities in the peripheral part thereof, the nonlinear intersymbol interference is more locally present in the peripheral part of the light receiving portion 62 as compared to the nonlinear intersymbol interference occurring by the interference of the reproduced signal light spot whose light intensity is highest in the middle part of the light receiving portion 62 and the incident lights from the adjacent spots whose light intensities are highest in the peripheral area of the light receiving portion 62 in the case where the pseudo random diffuser is not used as described above. Thus, in the case of combining the method using the pseudo random diffuser and the method using the smaller light receiving portions 62, the intersymbol interference can be more efficiently reduced as compared to cases where the two methods are singly used.

It was found out by a numerical calculation based on a fast Fourier transform that a S/N ratio caused by the intersymbol interference could be 10 dB or higher and precise signal reproduction having a bit error rate of $1/10000$ or smaller after the passage of the FIR filter was possible when the size of the light receiving portions 62 is set to be 0.94-fold or smaller of the pitch of the light receiving cells 61 in the case of using the pseudo random diffuser. Further, it was found out that a S/N ratio caused by the intersymbol interference could be 10 dB or higher and precise signal reproduction having a bit error rate of $1/10000$ or smaller after the passage of the FIR filter was possible when the size of the light receiving portions 62 is set to be 0.6-fold or smaller of the pitch of the light receiving cells 61 in the case of not using the pseudo random diffuser.

When the light receiving portions 62 are made smaller, there is an effect of reducing the intersymbol interference to enable the precise signal reproduction as described, whereas light receiving amounts decrease and electrical noises relatively increase to deteriorate the S/N ratio. Thus, the size of the light receiving portions 62 needs to be made maximally large while the intersymbol interference is sufficiently reduced. Therefore, it is optimal to set suitable ranges of the vertical and horizontal lengths of the light receiving portions 62 between 0.6-fold, inclusive, and 0.94-fold, inclusive, of the vertical and horizontal pitches of the light receiving cells 61.

Sixth Embodiment

Figure 11:
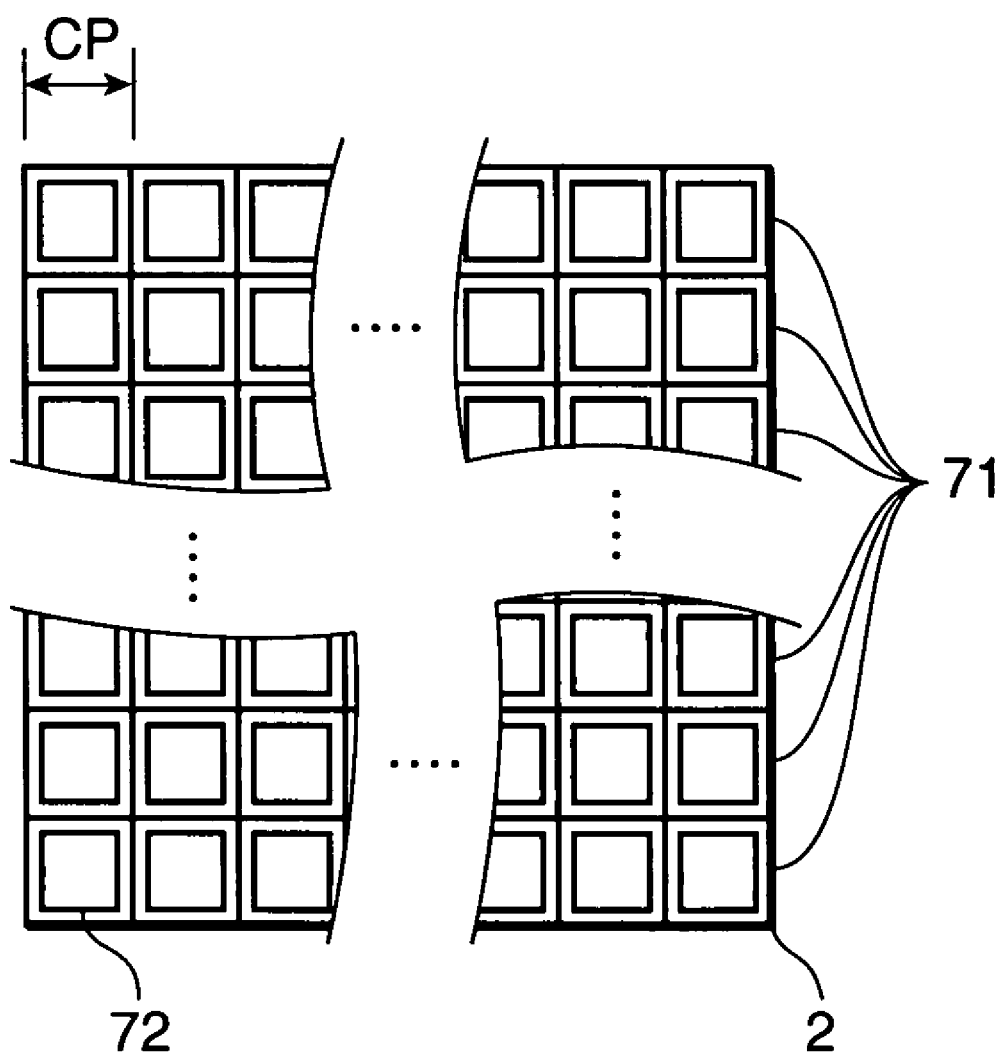
FIG. 11 is a schematic optical construction diagram of a spatial light modulating element used in a holographic optical information recording/reproducing device according to a sixth embodiment of the invention.

FIG. 11 is a schematic optical construction diagram of a spatial light modulating element used in a holographic optical information recording/reproducing device according to a sixth embodiment of the present invention. A characteristic feature of this embodiment is that the size of light transmitting portions 72 of the respective cells of a spatial light modulating element 2 is smaller than a cell pitch CP. Since the construction of the holographic optical information recording/reproducing device according to this embodiment is similar to the one shown in FIG. 1 except the spatial light modulating element 2 shown in FIG. 11, it is neither shown nor described in detail.

In the above construction, the spreads of the respective reproduced signal light spots on a two-dimensional light receiving element array 6 become smaller since the light intensity distribution of a signal light on a hologram of a holographic disc 5 spreads. This phenomenon can be calculated by obtaining an envelope of the light intensity distribution of the signal light on the hologram through the Fourier transform of the aperture shapes of the respective cells of the spatial light modulating element 2 and further obtaining the light intensity distributions of the reproduced signal light spots on the two-dimensional light receiving element array 6 through the inverse Fourier transform of the envelope of the obtained light intensity distribution of this signal light. If an optical system comprised of a recording lens 3 and a reproduction lens 4 is assumed as a 4f imaging system, explanation that an image size becomes smaller by reducing an object size is possible. Due to this phenomenon, the intensities of lights incident on adjacent cells become smaller to reduce intersymbol interference by reducing the size of the respective cells 71 of the spatial light modulating element 2. As a result, precise signal reproduction is possible.

Figure 12:
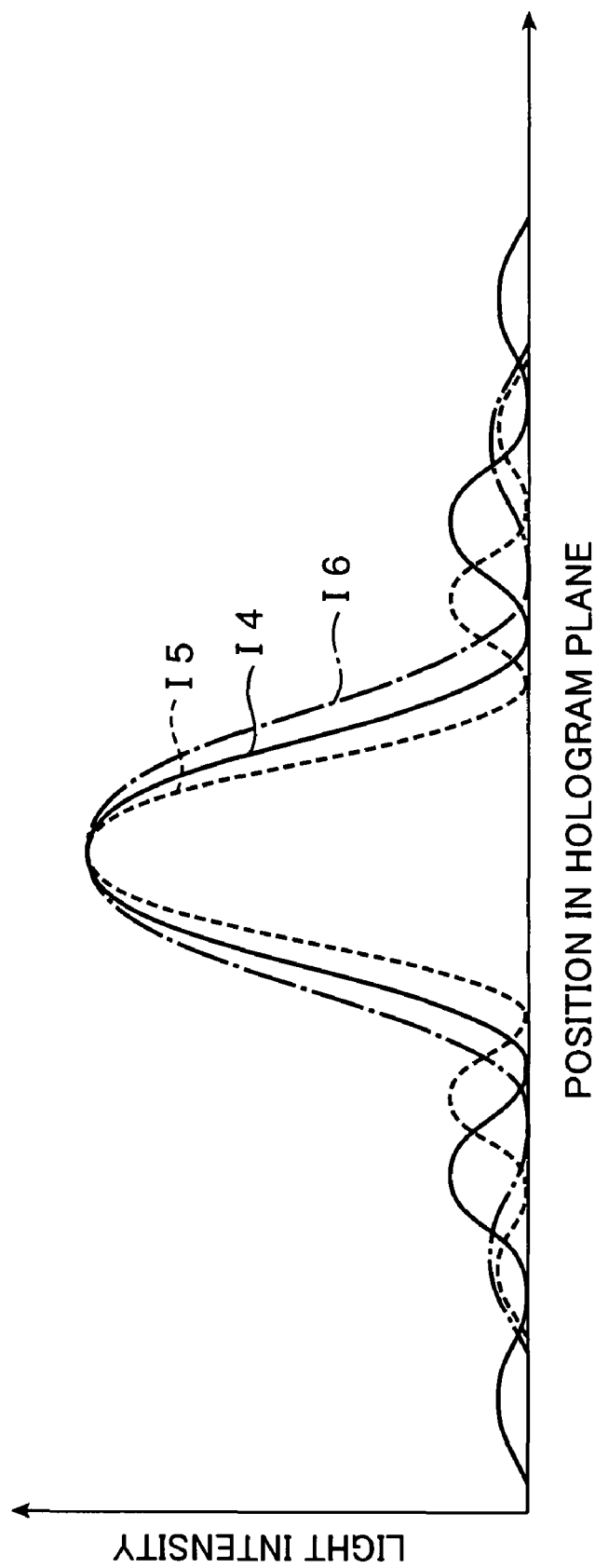
FIG. 12 is a graph showing envelopes of the light intensity distributions of signal lights on a hologram in the holographic optical information recording/reproducing device according to the sixth embodiment of the invention.

FIG. 12 show states of envelopes of the light intensity distributions of signal lights on a hologram in the case of using spatial light modulating elements having apertures smaller than the above cell pitch. An envelope I5 shown by broken line shows the light intensity distribution of the signal light on the hologram in the case of using a spatial light modulating element in which the respective cells have rectangular apertures as light transmitting portions 72. An envelope I4 shown by solid line shows the light intensity distribution of the signal light on the hologram in the case of using a spatial light modulating element in which the respective cells have even smaller rectangular apertures as light transmitting portions 72. It can be understood from FIG. 12 that the spread of the light intensity distribution on the hologram surface becomes larger when the apertures are made smaller, and an effect of reducing intersymbol interference can be expected.

An effect in the case of the above rectangular apertures was calculated by a numerical calculation based on a fast Fourier transform. As a result of calculations while changing a condition as to whether or not a pseudo random diffuser is present, it was found out that a S/N ratio caused by the intersymbol interference could be 10 dB or higher and precise signal reproduction having a bit error rate of $1/10000$ or smaller after the passage of an FIR filter was possible when the size of the light transmitting portions 72 is set between 0.55-fold, inclusive, and 0.92-fold, inclusive, of the cell pitch.

When the light transmitting portions 72 are made smaller, there is an effect of reducing the intersymbol interference and enabling precise signal reproduction as described above, whereas a light transmitting amount of the spatial light modulating element 2 decreases to reduce a light utilization efficiency. Thus, the size of the light transmitting portions 72 needs to be made maximally large while the intersymbol interference is sufficiently reduced. Therefore, it is optimal to set suitable ranges of the vertical and horizontal lengths of the light transmitting portions 72 between 0.55-fold, inclusive, and 0.92-fold, inclusive, of the cell pitch in the vertical and horizontal directions of the spatial light modulating element 2.

Figure 13:
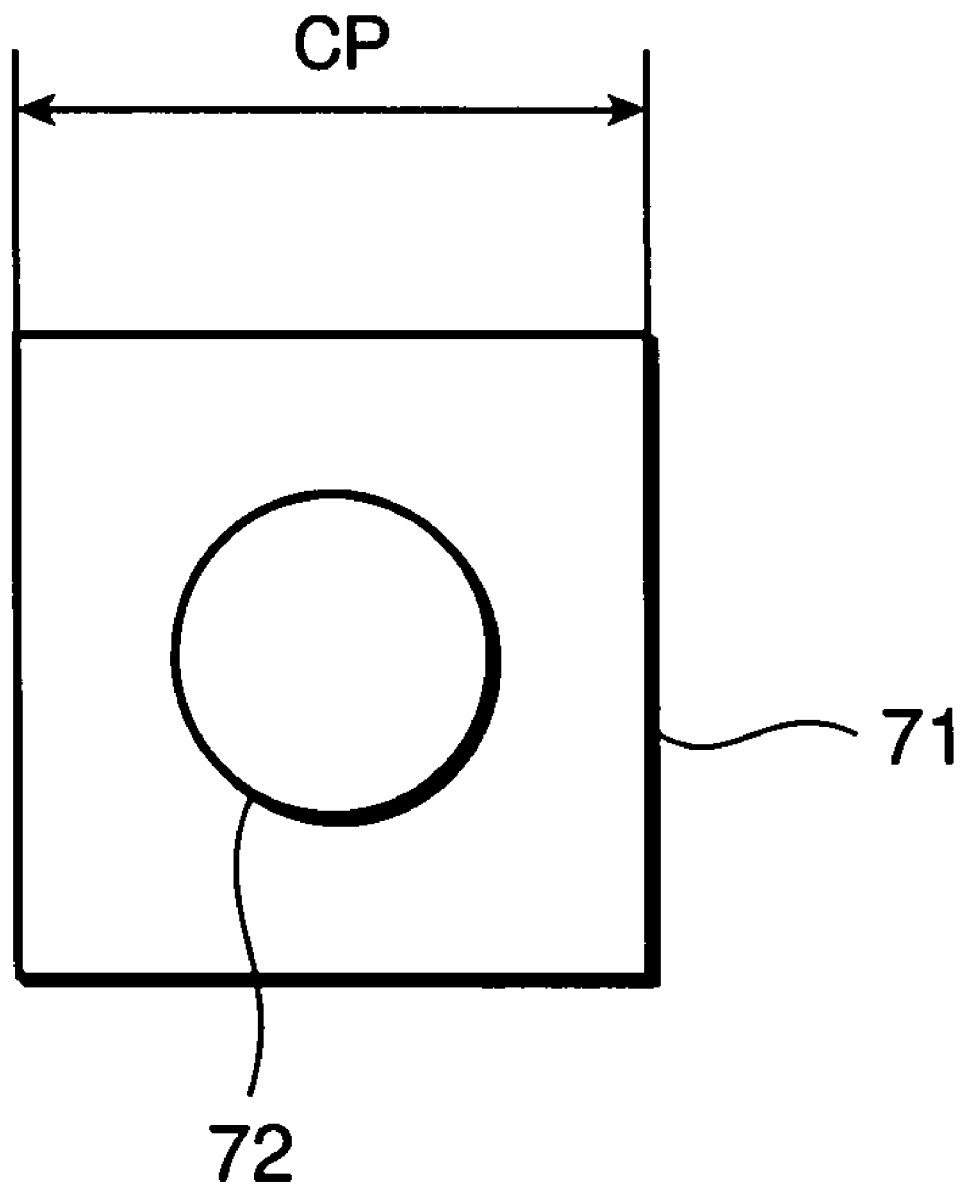
FIG. 13 is a diagram showing another example of the shape of an aperture of the spatial light modulating element.

An effect similar to the above can be obtained by making the shape of the light transmitting portions 72 as the apertures of the respective cells 71 of the spatial light modulating element circular as shown in FIG. 13. In this case, the shape of the envelope of the light intensity distribution of the signal light on the hologram is expressed by the square of a Bessel function and is as shown by an envelope I6 of FIG. 12. On the other hand, when the apertures of the cells 71 have rectangular shapes having the same maximum width, the shape of the envelope of the light intensity distribution of the signal light on the hologram is expressed by the square of a sinc function and is as shown by the envelope I4 of FIG. 12. If these Bessel function and sinc function are compared, the spread of the Bessel function is larger than that of the sinc function. Thus, if the apertures of the respective cells 71 of the spatial light modulating element have circular shapes, the spread of the light intensity distribution on the hologram surface becomes larger and an effect of reducing the intersymbol interference is expected.

Figure 14:
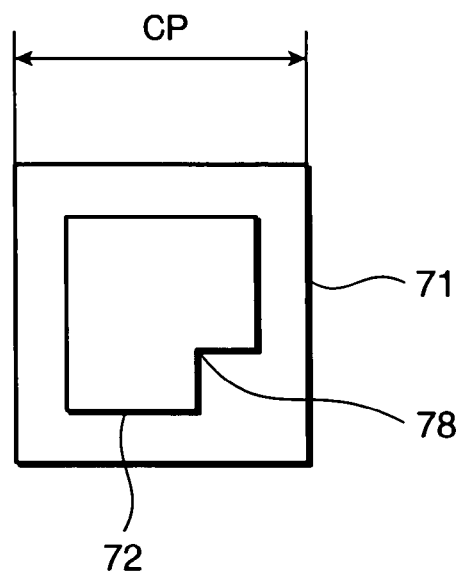
FIG. 14 is a diagram showing another example of the shape of the aperture of the spatial light modulating element.

A similar effect can be realized by providing an inwardly convex section 78 in a part of each light transmitting portion 72 as the aperture of the cell 71 of the spatial light modulating element as shown in FIG. 14. In the case, the degree of the spread of the envelope of the light intensity distribution of the signal light on the hologram becomes smaller than when the aperture shapes are circular. On the other hand, in the case of using, for example, a transmission-type liquid crystal element using a TN liquid crystal element as the spatial light modulating element, the apertures can be efficiently restricted by arranging circuit portions such as thin-film transistors for driving the liquid crystal element at the inward convex sections 78 of the apertures.

Figure 15:
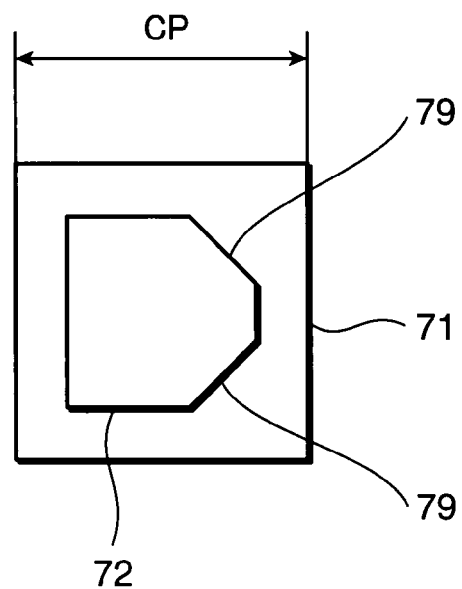
FIG. 15 is a diagram showing another example of the shape of the aperture of the spatial light modulating element.

An effect similar to the above can also be obtained by partially cutting the light transmitting portions 72 as the apertures of the respective cells 71 of the spatial light modulating element at corner parts of the substantially rectangular aperture to obtain notches 79 as shown in FIG. 15.

Figure 16:
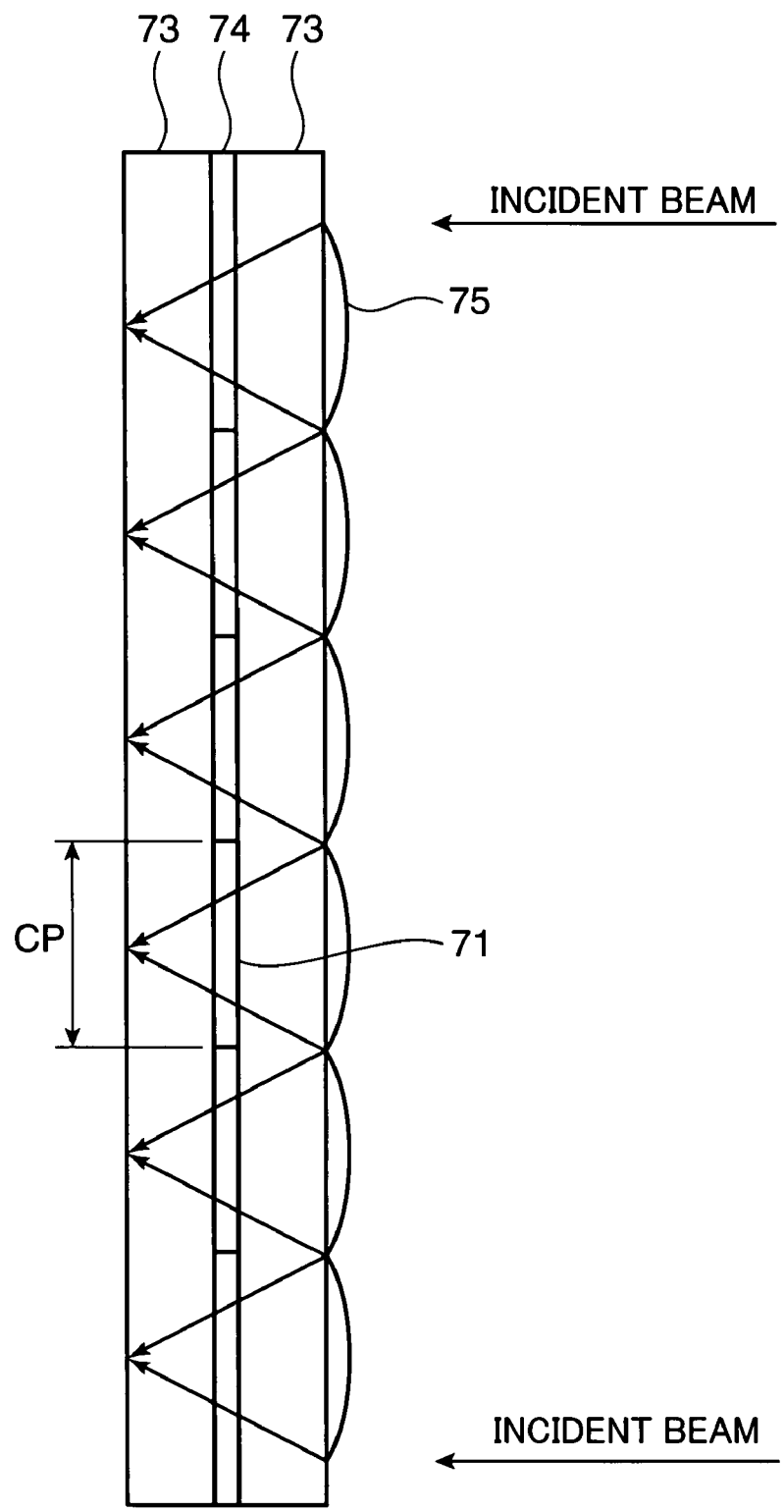
FIG. 16 is a schematic construction diagram showing a sectional structure of another spatial light modulating element.

Further, a similar effect can be obtained by a construction in which a microlens array 75 is so arranged in proximity as to correspond to cells 71 of a spatial light modulating element including two glass substrates 73, 74 and a liquid crystal layer 74 sealed between the glass substrates 73, 74 as shown in FIG. 16, so that beams transmitting through the respective cells are condensed. In this case, there is an effect of improving a light utilization efficiency in addition to the effect of reducing the intersymbol interference.

Although the transmission-type spatial light modulating element is used in this embodiment, other optical switch arrays having arbitrary constructions such as a so-called LCOS device constructed by forming a reflection film on a silicon substrate and further adding a liquid crystal element and a so-called DLP device that is an optical switch array for controlling a direction of a reflected light by vibrating a micromirror can be similarly used without being particularly limited to this example.

Seventh Embodiment

Figure 17:
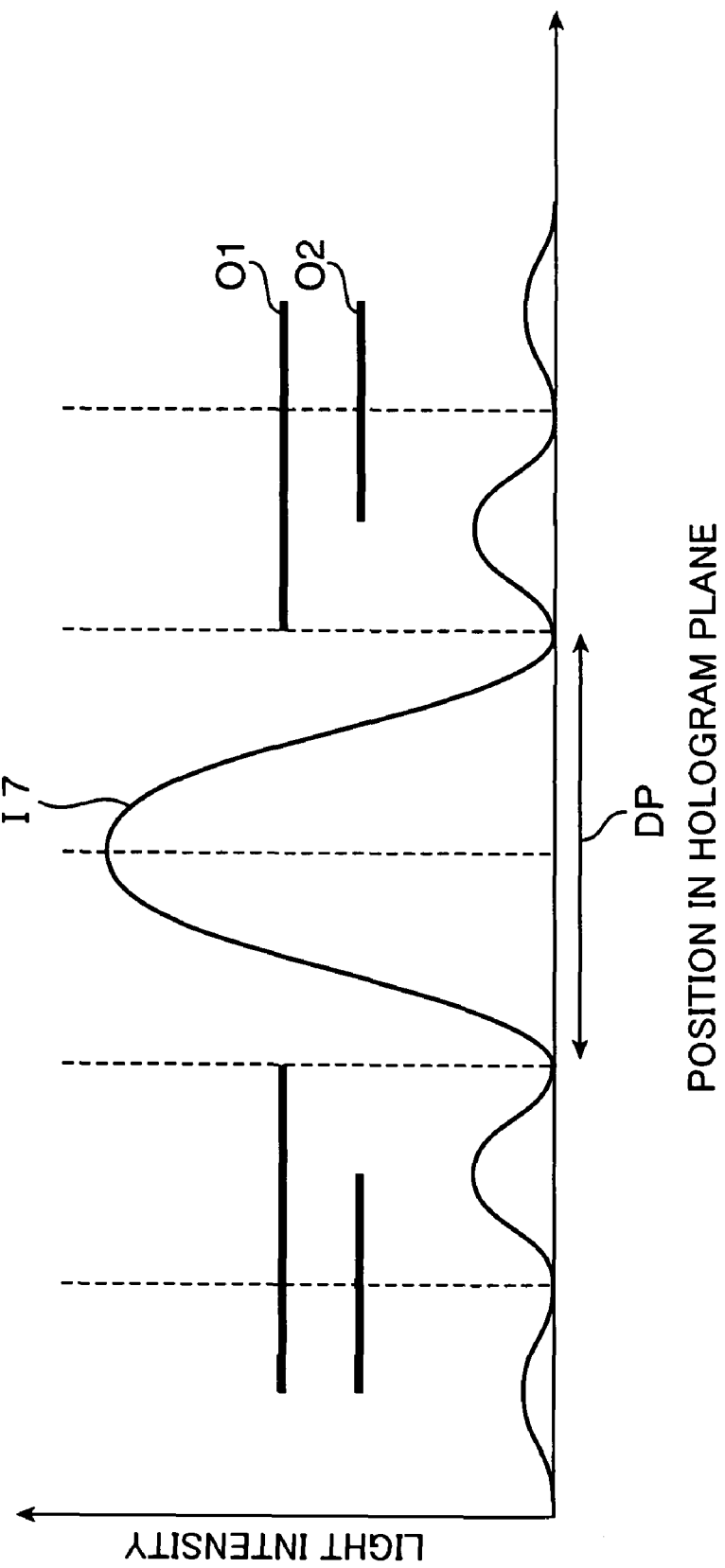
FIG. 17 is a graph showing an envelope of the light intensity distribution of a signal light at an aperture near a hologram surface in a holographic optical information recording/reproducing device according to a seventh embodiment of the invention.
Figure 18:
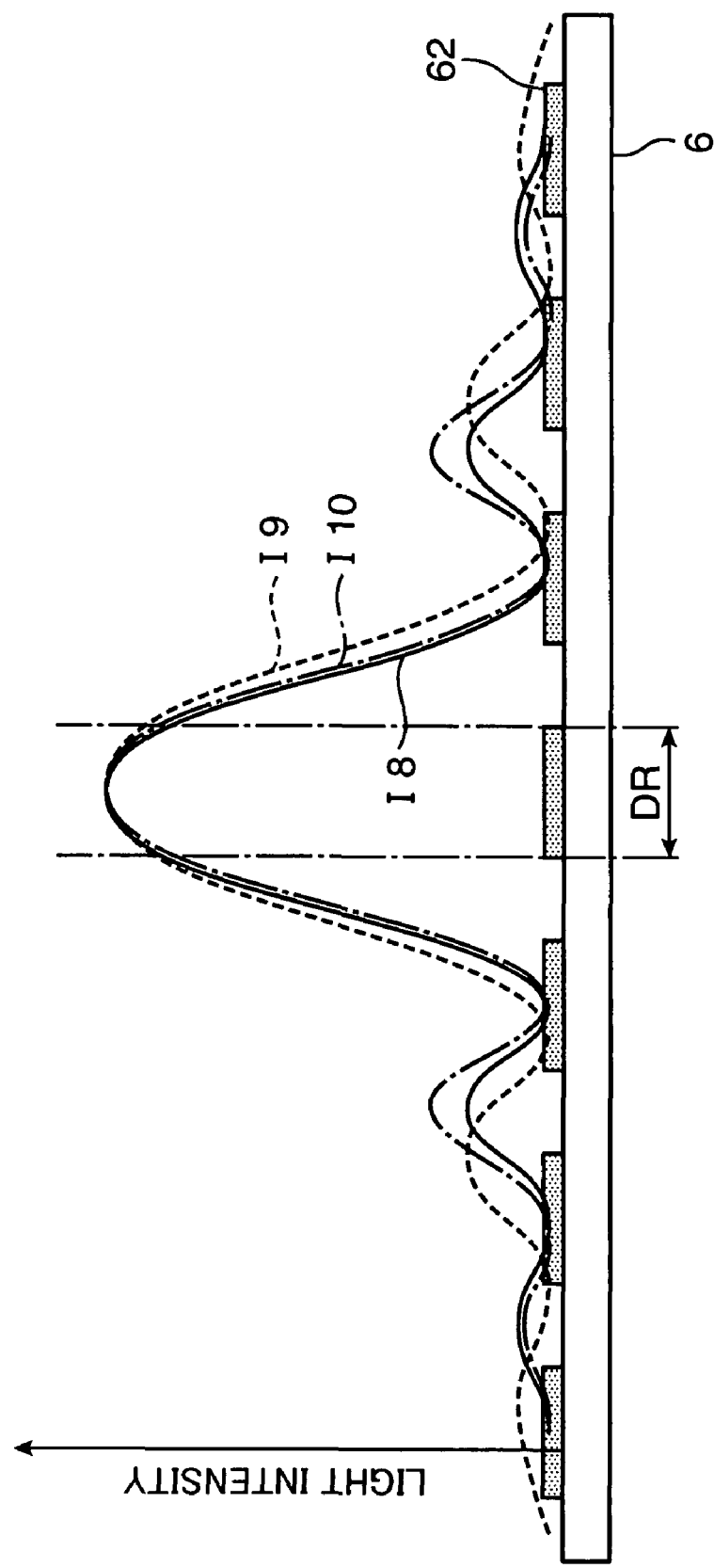
FIG. 18 is a graph showing a calculation result of the light intensity distributions of reproduced signal light spots on a two-dimensional light receiving element surface when a light shielding member having apertures near the hologram surface in the holographic optical information recording/reproducing device according to the seventh embodiment of the invention.

FIG. 17 shows a state of the light intensity distribution of a signal light at an aperture near a hologram surface in a holographic optical information recording/reproducing device according to a seventh embodiment of the present invention, and FIG. 18 shows calculation results of the light intensity distributions of reproduced signal light spots on a two-dimensional light receiving element array 6 when light shielding members having apertures near the hologram surface are disposed. Since the construction of the holographic optical information recording/reproducing device according to this embodiment is similar to the one shown in FIG. 1 except that the light shielding member is disposed near the hologram surface, it is neither shown nor described in detail.

As shown in FIG. 17, an envelope of the light intensity distribution of the signal light on the hologram when a spatial light modulating element 2 having rectangular apertures is used is represented by a solid-line 17. The light intensity distribution of the reproduced signal light spots when light shielding members O1, O2 having apertures whose sizes are 0.5-fold and 0.75-fold of the size of a $0^{th}$-order light component of a diffracted light from each aperture of the spatial light modulating element 2 are disposed near the hologram surface is as shown in FIG. 18.

It was found out that the first nulls of the light intensity distribution of the reproduced signal light spot were located substantially right above adjacent light receiving portions 62 of the two-dimensional light receiving element array 6 to reduce the intersymbol interference as shown by a solid line 18 in FIG. 18 in the case where a reproduction lens 4 has no aberration and a light shielding member O1 with apertures having the same size as the $0^{th}$-order light components of the diffracted lights from the apertures of the spatial light modulating element 2 is disposed near the hologram surface.

It was also found out that the side lobes of the light intensity distribution of the reproduced signal light spot were located substantially right above the adjacent light receiving portions 62 of the two-dimensional light receiving element array 6 to increase the intersymbol interference as shown by a broken line 19 in FIG. 18 in the case where the reproduction lens 4 has an aberration and the light shielding member O1 with apertures having the same size as the $0^{th}$-order light components of the diffracted lights from the apertures of the spatial light modulating element 2 is disposed near the hologram surface.

It was further found out that the side lobes of the light intensity distribution of the reproduced signal light spot were located substantially right above the adjacent light receiving portions 62 of the two-dimensional light receiving element array 6 to increase the intersymbol interference as shown by a dashed line 110 in FIG. 18 in the case where the reproduction lens 4 has an aberration and the light shielding member O2 with apertures whose size is 0.75-fold of the size of the $0^{th}$-order light components of the diffracted lights from the apertures of the spatial light modulating element 2 is disposed near the hologram surface.

Although not shown, it was found out that the first nulls of the light intensity distribution of the reproduced signal light spot were located at more distant positions on the two-dimensional light receiving element array 6 in the case where the reproduction lens 4 has a larger aberration and the light shielding member O1 with apertures whose size was 0.5-fold of the size of the $0^{th}$-order light components of the diffracted lights from the apertures of the spatial light modulating element 2 is disposed near the hologram surface. It was also found out that, in this case, the positions of the first nulls could be located substantially right above the adjacent light receiving portions 62 of the two-dimensional light receiving element array 6 by disposing a light shielding member with apertures having a larger size near the hologram surface.

From the above, the size of the apertures located near the hologram surface is preferably set between 0.55-fold, inclusive, and 0.9-fold, inclusive, of the size of the $0^{th}$-order light components (size of main lobes of the $0^{th}$-order diffracted lights) of the diffracted lights from the apertures of the spatial light modulating element 2 and more preferably between 0.55-fold, inclusive, and 0.75-fold, inclusive, upon constructing the holographic optical information recording/reproducing device in view of the aberrations of the reproduction lens and the recording lens and the defocusing of the reproduction lens. In this case, there is less intersymbol interference and signal reproduction having a high signal quality can be performed.

Eighth Embodiment

Figure 19:
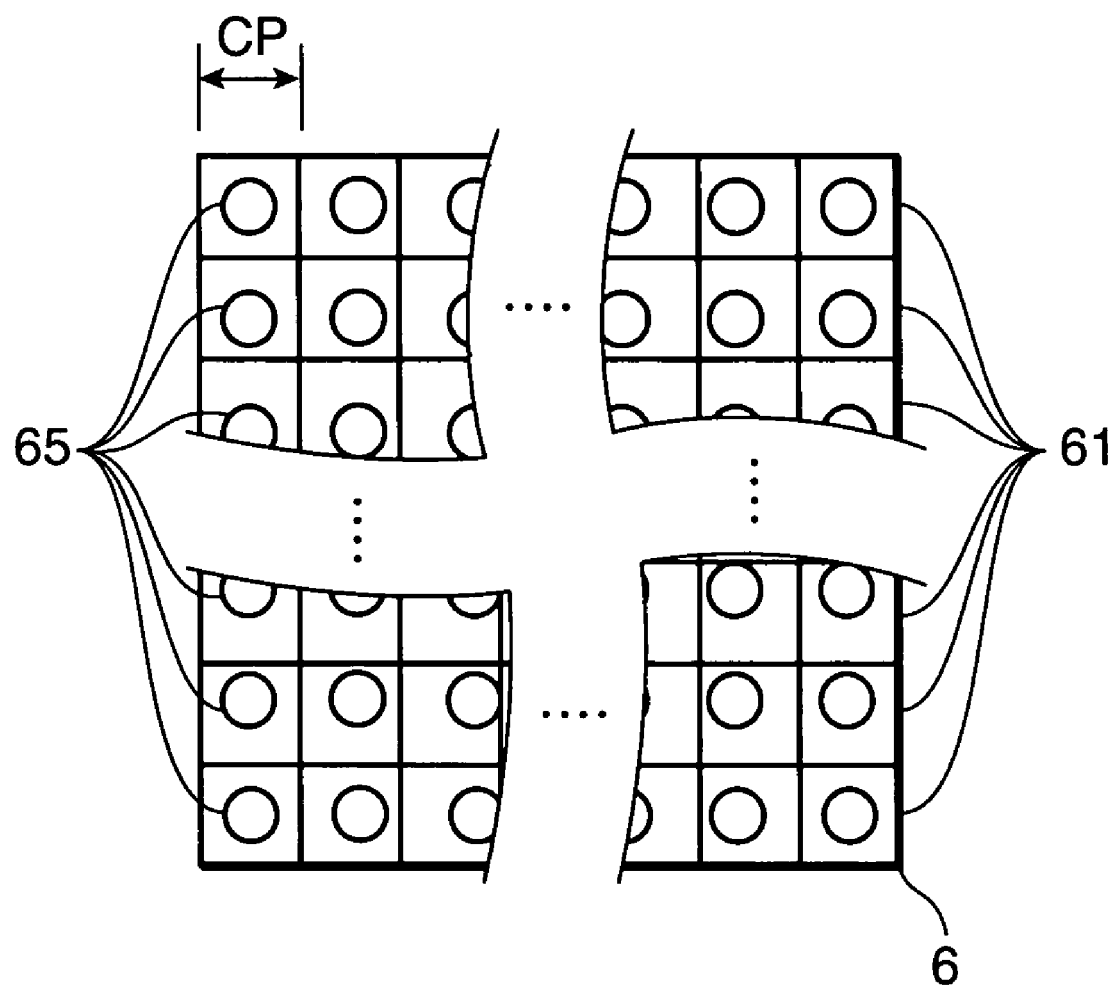
FIG. 19 is a schematic plan view showing the construction of a two-dimensional light receiving element array used in a holographic optical information recording/reproducing device according to an eighth embodiment of the invention.
Figure 20:
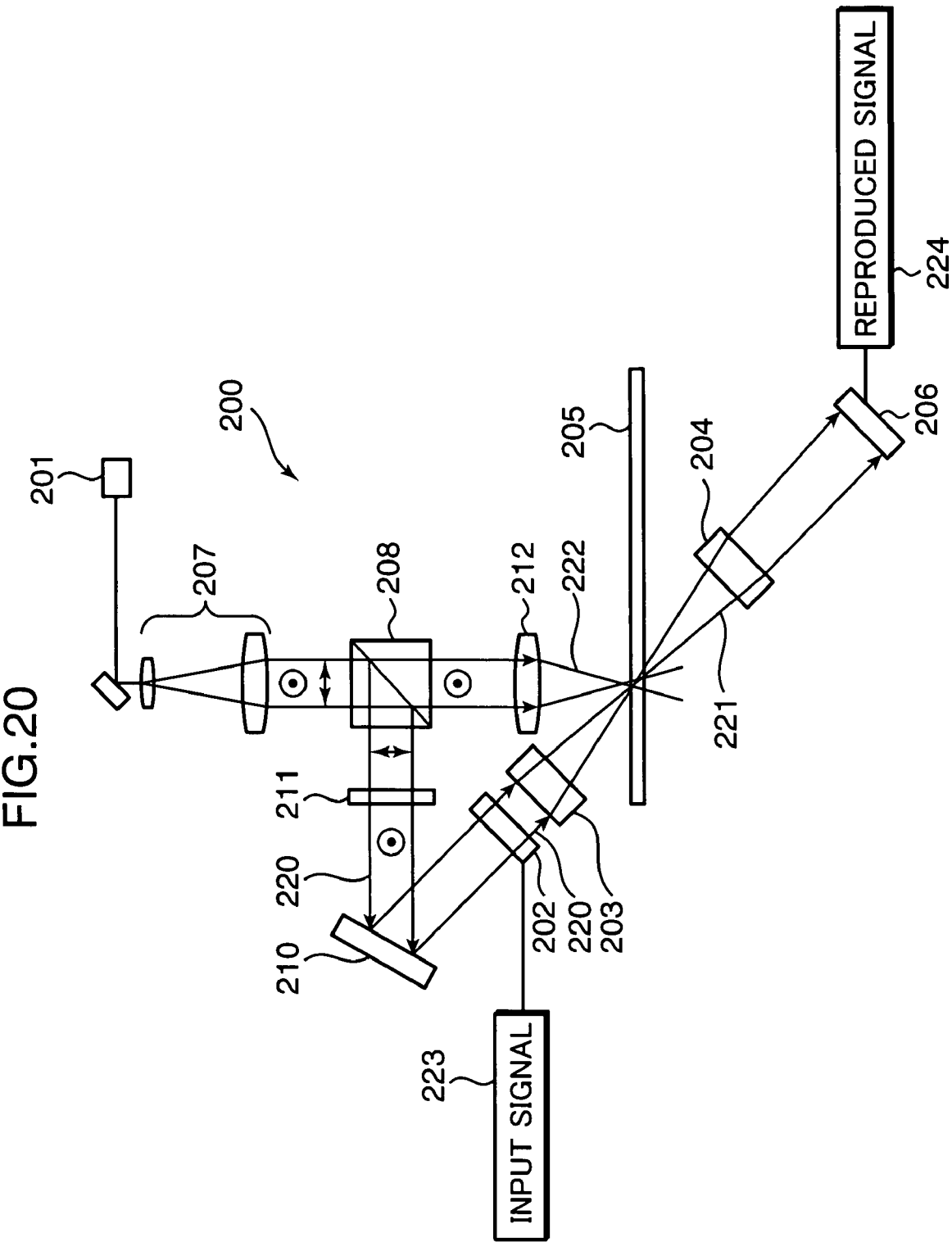
FIG. 20 is a schematic construction diagram of a conventional holographic optical information recording/reproducing device.

FIG. 19 is a schematic plan view showing the construction of a two-dimensional light receiving element array 6 used in a holographic optical information recording/reproducing device according to an eighth embodiment of the present invention. A characteristic feature of this embodiment is that a spot pitch of a reproduced signal light spot array is larger than a pitch CP of light receiving cells 61 of the two-dimensional light receiving element array 6, but does not exceed twice the pitch CP. Since the construction of the holographic optical information recording/reproducing device according to this embodiment is similar to the one shown in FIG. 1 except the two-dimensional light receiving element array 6 shown in FIG. 19, it is neither shown nor described in detail.

Upon performing a sampling detection to an original signal, if a sampling frequency is smaller than the bandwidth of the original signal, a part of the original signal is lost and the signal cannot be precisely restored. In a conventional holographic optical information recording/reproducing device, a reproduced signal light spot array are set at the same pitches as cells of a two-dimensional light receiving element array, one reproduced signal light spot is related to one cell of the two-dimensional light receiving element array so that the respective reproduced signal light spots and the respective cells of the two-dimensional light receiving element array are in one-to-one correspondence.

However, in an actual holographic optical information recording/reproducing device, there are cases where the pitch of the reproduced signal light spots becomes larger than the cell pitch of the two-dimensional light receiving element array 6 in the entirety or part(s) of the two-dimensional light receiving element array 6 due to the aberrations of lenses, the distortions of the lenses and the thermal expansion of the two-dimensional light receiving element array 6 caused by an environmental temperature change. In such cases, it is difficult to precisely reproduce a signal. In order to cause an array of a great number of reproduced signal light pits to precisely coincide with the positions of the respective cells of the two-dimensional light receiving element array 6, multiaxial servo operations are necessary for adjusting positions of two axes in a plane of the two-dimensional light receiving element array 6, a position in a focusing direction, swing directions of the two axes, and a direction of in-plane rotation with respect to the reproduced signal light spot array, which has caused a disadvantage of enlarging a system.

Further, in a construction of causing the plurality of light receiving cells to correspond to the respective reproduced signal light spots, the precise multiaxial servo operations as described above are not necessary but, with this construction, the number of the light receiving cells of the two-dimensional light receiving element array 6 increases to increase the cost of the two-dimensional light receiving element array 6. Further, since a great number of data are generated, there has been a disadvantage of enlarging the size of a signal processing circuit provided at a subsequent stage.

In order to overcome these problems, the spot pitch of the reproduced signal light spot array is set to be larger than the cell pitch of the two-dimensional light receiving element array 6, but not to exceed twice the cell pitch in the holographic optical information recording/reproducing device according to this embodiment. At this time, by applying suitable filtering to output signals from the two-dimensional light receiving element array 6, the original signal can be precisely reproduced by a simple system that needs not perform a detailed multiaxial servo control for the two-dimensional light receiving element array 6 and an increase in the number of the cells of the two-dimensional light receiving element array 6 can be restricted.

If the spot pitch of the reproduced signal light spot array takes a value close to the cell pitch of the two-dimensional light receiving element array 6, no precise signal reproduction can be performed particularly when the reproduced signal has a low S/N ratio due to noise caused by intersymbol interference and stray light, electrical noise and the like. Thus, it is preferable to add the following constructions to the construction in which the spot pitch of the reproduced signal light spot array is set to be larger than the cell pitch of the two-dimensional light receiving element array 6, but not to exceed twice the cell pitch.

Specifically, by using a construction in which the size of light receiving portions 62 of the respective cells of the two-dimensional light receiving element array 6 is smaller than the cell pitch, a construction in which the size of light transmitting portions 72 of cells of a spatial light modulating element 2 is smaller than the cell pitch, a construction in which a pseudo random diffuser is superimposed on the spatial light modulating element 2 or a combination of these constructions, the degree of the intersymbol interference in the reproduced signal light spot array is reduced to enable precise signal reproduction.

There is also proposed a coding method having a low probability of locating reproduced signal light spots in the ON state adjacent to each other. For example, there is such a coding method that, out of a total of four cells including two cells in vertical direction and two cells in horizontal direction, only one cell is turned on and two bits are expressed by the four cells, and this method is known to engineers in this technical field. In this case, the probability of an arbitrary cell being in the ON state is ¼ and the probability of having the cells in the ON state adjacent to each other is lower as compared to random coding according to which all the cells can be in the ON or OFF state. By combining the coding method with a low probability of having the cells in the ON state adjacent to each other and the construction in which the spot pitch of the reproduced signal light spot array is larger than the cell pitch of the two-dimensional light receiving element array 6, but does not exceed twice the cell pitch, a holographic optical information recording/reproducing device can be realized which requires no complicated servo function and is capable of precise signal reproduction.

In all the above embodiments is described the holographic optical information recording/reproducing device constructed such that the reproduced signal light is extracted from the side opposite to the incident side of the signal light on the holographic disc. However, the present invention is similarly applicable to a construction in which a reflection layer is provided on a part of the holographic disc for the recording and reproduction at the same side of the holographic disc.

Further, although the holographic optical information recording/reproducing device adopting the shift multiplexing method using the spherical reference wave as shown in FIG. 1 is described in the above embodiments, the present invention is similarly applicable to other multiplexing methods such as a wavelength multiplexing method, an angle multiplexing method, a peristrophic multiplexing method, a shift multiplexing method using a reference wave with a speckle pattern, and a phase code multiplexing method.

Although the signal light beam and the reference light beam are irradiated to the holographic disc through the different lenses in the above embodiments, the present invention is similarly applicable to a construction in which the signal light beam and the reference light beam are irradiated to the holographic disc through the same lens.

Although the holographic recording medium is a round disc and a plurality of holograms are recorded while the holographic disc is rotated in the above embodiments, the present invention is similarly applicable to cases where the holographic recording medium has another shape such as a rectangular shape or has a solid shape such as a substantially cubic shape or a substantially cylindrical shape instead of having a disc shape and also to constructions adopting another method of moving the holographic recording medium such as the one in which a plurality of holograms are recorded while the holographic medium is two-dimensionally moved in an XY-plane.

Although the construction using the two-dimensional spatial light modulating element and the two-dimensional light receiving element array as a spatial light modulating element and a light receiving element array is described in the above embodiments, the present invention is similarly applicable to constructions using a one-dimensional spatial light modulating element such as a GLV and a one-dimensional light receiving element array such as a CCD line sensor.

As described above, a holographic optical information recording/reproducing device according to one aspect of the present invention comprises a coherent light source; and beam splitting means for splitting a light from the coherent light source, wherein one of light beams split by the beam splitting means becomes a beam array modulated and arrayed by a spatial light modulating element, the beam array serving as a signal light, the other light beam split by the beam splitting means becomes a reference light, the signal light and the reference light intersect in a recording medium to generate interference fringes and the interference fringes are recoded as holograms in the recording medium at the time of recording information; only the reference light is irradiated to the recording medium and a diffracted light generated in the recording medium is detected by a light receiving element at the time of reproducing information; and the power of the reference light in the recording medium for information reproduction is larger than a sum of the power of the reference light and the power of the signal light in the recording medium for information recording.

Since the power of the reference light in the recording medium for information reproduction is larger than the sum of the power of the reference light and the power of the signal light in the recording medium for information recording in this holographic optical information recording/reproducing device, the quality of the reproduced signal can be improved and the signal can be reproduced at a fast transfer rate.

The power of the reference light in the recording medium for information reproduction is preferably larger than twice the sum of the power of the reference light and the power of the signal light in the recording medium for information recording.

In this case, the quality of the reproduced signal can be further improved and the signal can be reproduced at a faster transfer rate.

The above holographic optical information recording/reproducing device preferably further comprises changing means for changing a power distribution ratio of the reference light and the signal light split by the beam splitting means.

In this case, the power distribution ratio of the reference light and the signal light can be arbitrarily changed at the time of recording and reproducing information.

The changing means preferably changes the power distribution ratio depending on the recording medium.

In this case, the reference light and the signal light can be irradiated on an optimal exposure condition at the time of recording for each recording medium.

The changing means preferably changes the power distribution ratio depending on an incident angle of the reference light.

In this case, the holograms can be recorded by setting the power distribution ratio of the reference light and the signal light in the recording medium constant regardless of the incident angle of the reference light, and the light intensities of reproduced signal lights from the respective holograms can be set constant.

The changing means preferably changes the power distribution ratio depending on a coding method of the information recorded in the recording medium.

In this case, the reference light and the signal light can be irradiated on a condition suitable for each coding method.

The beam splitting means preferably includes a polarizing beam splitter.

In this case, the light from the coherent light source can be split into the reference light and the signal light by a simple construction.

The beam splitting means preferably distributes all the light power to the reference light at the time of reproducing the information.

In this case, the deterioration of an S/N ratio caused by the superimposition of a little leak light propagating in a light path of the signal light on the reproduced signal light can be reduced.

It is preferable to shield only the signal light after the hologram is recorded in the recording medium and to verify the information recoded in the hologram by receiving a diffracted light from the recorded hologram by means of the light receiving element.

In this case, the information recorded in the hologram can be read out immediately after the recording to realize high-speed verification.

The above holographic optical information recording/reproducing device preferably further comprises changing means for setting the power distribution ratio such that the reference light and the signal light are incident on the recording medium at the time of recording the information and changing the power distribution ratio such that all the light power is distributed to the reference light after the recording of the information.

In this case, it is possible to read the data recorded in the hologram out to perform a high-speed verification and monitor the diffraction efficiency of the recorded hologram immediately after the recording.

The changing means preferably includes an EO modulator.

In this case, the power distribution ratio of the signal light and the reference light can be controlled at high speed.

The light receiving element preferably discharges accumulated light electric charges once when the changing means changes the power distribution ratio to distribute all the light power to the reference light.

In this case, unnecessary light electric charges accumulated in the light receiving element can be discharged once, wherefore the reproduced signal light can be precisely detected.

A time during which the holograms are recorded in a state where the changing means sets the power distribution ratio to cause the reference light and the signal light to be incident on the recording medium at the time of recording the information is preferably longer than a time during which the holograms are reproduced in a state where the changing means changes the power distribution ratio to distribute all the light power to the reference light after the recording of the information.

In this case, the polymerization of monomers in the recording medium is caused to advance by the reproduction, whereby a reduction in the dynamic range of a recording material can be suppressed.

A relative positional relationship of the reference light and the recording medium is preferably so maintained as not to move longer than a specified distance during a period in which the holograms are reproduced in a state where the changing means changes the power distribution ratio to distribute all the light power to the reference light after the recording of the information by a shift multiplexing method.

In this case, a reduction in the contrast of the recorded interference fringes by a deviation of the relative positional relationship of the reference light and the recording medium can be prevented.

It is preferable to detect the diffraction efficiencies of the recorded holograms during the period in which the changing means changes the power distribution ratio to distribute all the light power to the reference light after the recording of the information.

In this case, by monitoring the diffraction efficiencies from the recorded holograms, a method can be used according to which, for example, recording is made with such an exposure amount that the diffraction efficiencies of the respective holograms show suitable values and the multiplexing of the holograms is stopped before it is impossible to obtain sufficient diffraction efficiencies because of the shortage of monomers. This can prevent an occurrence of an undesired situation where monomers run out during the multiplex recording and the holograms recorded in the latter half cannot be properly recorded.

The holographic optical information recording/reproducing device preferably further comprises light shielding means arranged in the light path of the signal light to shield the signal light.

In this case, the deterioration of an S/N ratio caused by the superimposition of a little leak light propagating in a light path of the signal light on the reproduced signal light can be reduced.

It is preferable to completely expose and saturate the recording material of the recording medium by irradiating a light from the coherent light source substantially only to a location on the recording medium where the holograms are recorded and the multiplex recording is not saturated after the recording of the holograms in the recording medium.

In this case, the holograms can be fixed substantially only at the location where the holograms are recorded and the multiplex recording is not saturated. Thus, a time required for the fixing process can be shortened and the recording process can be more speedily completed.

The above holographic optical information recording/reproducing device preferably further comprises a fixing light source for irradiating a light substantially only to a location on the recording medium where the holograms are recorded and the multiplex recording is not saturated after the recording of the holograms in the recording medium, thereby completely exposing and saturating the recording material of the recording medium.

In this case, using the fixing light source, the fixing process can be performed with a larger power density than at the time of recording. Thus, the monomers can be more completely polymerized and the fixing process can be completed within a shorter period of time.

It is preferable that the above holographic optical information recording/reproducing device further comprises a reproduction lens for introducing a diffracted light from the recording medium as a reproduced signal light to the light receiving element; and that the focal length of the reproduction lens is variable.

In this case, the positions of beam spots of the reproduced signal light and those of light receiving cells of the light receiving element can be more easily aligned to enable precise signal reproduction by adjusting the magnification of the reproduction lens in accordance with the entire image size of the beam array of the reproduced signal light.

It is preferable that the number of the light receiving cells of the light receiving element is larger than the number of the beams of the reproduced signal light; and that the light receiving cells of the light receiving element are arrayed in a range larger than the size of the beam array of the reproduced signal light.

In this case, the entire image size of the beam array of the reproduced signal light can be known by applying an image processing to an output signal from the light receiving element in both cases where the entire image size of the beam array of the reproduced signal light becomes larger than and smaller than a desired image size. Therefore, the positions of beam spots of the reproduced signal light and those of light receiving cells of the light receiving element can be more easily aligned to enable precise signal reproduction.

It is preferable that the above holographic optical information recording/reproducing device further comprises a recording lens for introducing a light from the spatial light modulating element to the recording medium; and that the focal length of the recording lens is variable.

In this case, holograms for generating a reproduced image of a suitable size can be recorded by adjusting the magnification of the recording lens even if the holograms for generating the reproduced image of the suitable size cannot be recorded due to the distortion of the recording lens.

It is preferable that the above holographic optical information recording/reproducing device further comprises a recording lens for introducing a light from the spatial light modulating element to the recording medium and a reproduction lens for introducing a diffracted light from the recording medium as a reproduced signal light to the light receiving element; and that the recording lens and the reproduction lens have substantially the same distortion.

In this case, there is more freedom in lens designing. Thus, it is possible to reduce the number of constituent lenses, to lower the prices of the lenses, and to reduce the weights of the lenses.

The length of light receiving portions of the respective light receiving cells of the light receiving element is preferably between 60%, inclusive, and 94%, inclusive, of a cell pitch of the light receiving cells of the light receiving element.

In this case, the incidence of lights from adjacent spots can be effectively reduced and the deterioration of the S/N ratio can be suppressed by preventing a drop in a light receiving amount.

The length of light transmitting portions of cells of the spatial light modulating element is preferably between 55%, inclusive, and 92%, inclusive, of the pitch of the cells of the spatial light modulating element.

In this case, intersymbol interference can be reduced to enable precise signal reproduction and a light utilization efficiency can be improved.

It is preferable that apertures are provided near a surface of the recording medium at an incident side of the beam array modulated by the spatial light modulating element; and that the size of the apertures is so adjusted as to permit the transmission of lights within a range between 0.55-fold, inclusive, and 0.9-fold, inclusive, of the main lobe of a $0^{th}$-order diffracted light diffracted when the signal light transmits through each cell of the spatial light modulating element.

In this case, there is little intersymbol interference and the signal can be reproduced with high quality.

The pitch of the light receiving cells of the light receiving element is preferably smaller than the pitch of spot array of the diffracted light on the light receiving element, but larger than half the pitch of the spot array.

In this case, it becomes unnecessary to perform a precise multiaxial servo control for the light receiving element by applying suitable filtering to an output signal from the light receiving element, thereby being able to simplify the construction of the device, an original signal can be precisely reproduced, and an increase in the number of the light receiving cells of the light receiving element can be suppressed.

A holographic optical information recording/reproducing method according to another aspect of the present invention using a holographic optical information recording/reproducing device comprising a coherent light source, and beam splitting means for splitting a light from the coherent light source, comprising the steps of: making one of light beams split by the beam splitting means into a beam array modulated and arrayed by a spatial light modulating element, the beam array serving as a signal light, making the other light beam split by the beam splitting means into a reference light, causing the signal light and the reference light to intersect in a recording medium to generate interference fringes and recording the interference fringes as holograms in the recording medium at the time of recording information; and irradiating only the reference light to the recording medium and detecting a diffracted light generated in the recording medium by a light receiving element at the time of reproducing information; wherein the power of the reference light in the recording medium for information reproduction is larger than a sum of the power of the reference light and the power of the signal light in the recording medium for information recording.

In this holographic optical information recording/reproducing method, since the power of the reference light in the recording medium for information reproduction is larger than the sum of the power of the reference light and the power of the signal light in the recording medium for information recording, the quality of the reproduced signal can be improved and the signal can be reproduced at a fast transfer rate.

Another holographic optical information recording/reproducing device according to another aspect of the present invention comprises a coherent light source; and beam splitting means for splitting a light from the coherent light source, wherein one of light beams split by the beam splitting means becomes a beam array modulated and arrayed by a spatial light modulating element, the beam array serving as a signal light, the other light beam split by the beam splitting means becomes a reference light, the signal light and the reference light intersect in a recording medium to generate interference fringes and the interference fringes are recoded as holograms in the recording medium at the time of recording information; and only the reference light is irradiated to the recording medium and a diffracted light generated in the recording medium is detected by a light receiving element at the time of reproducing information; the holographic optical information recording/reproducing device further comprising a recording lens for introducing a light from the spatial light modulating element to the recording medium, the focal length of the recording lens being variable.

Another holographic optical information recording/reproducing device according to another aspect of the present invention comprises a coherent light source; and beam splitting means for splitting a light from the coherent light source, wherein one of light beams split by the beam splitting means becomes a beam array modulated and arrayed by a spatial light modulating element, the beam array serving as a signal light, the other light beam split by the beam splitting means becomes a reference light, the signal light and the reference light intersect in a recording medium to generate interference fringes and the interference fringes are recoded as holograms in the recording medium at the time of recording information; and only the reference light is irradiated to the recording medium and a diffracted light generated in the recording medium is detected by a light receiving element at the time of reproducing information; the holographic optical information recording/reproducing device further comprising a recording lens for introducing a light from the spatial light modulating element to the recording medium and a reproduction lens for introducing a diffracted light from the recording medium as a reproduced signal light to the light receiving element, and the recording lens and the reproduction lens having substantially the same distortion.

Another holographic optical information recording/reproducing device according to another aspect of the present invention comprises a coherent light source; and beam splitting means for splitting a light from the coherent light source, wherein one of light beams split by the beam splitting means becomes a beam array modulated and arrayed by a spatial light modulating element, the beam array serving as a signal light, the other light beam split by the beam splitting means becomes a reference light, the signal light and the reference light intersect in a recording medium to generate interference fringes and the interference fringes are recoded as holograms in the recording medium at the time of recording information; and only the reference light is irradiated to the recording medium and a diffracted light generated in the recording medium is detected by a light receiving element at the time of reproducing information; wherein only the signal light is shielded after the holograms are recorded in the recording medium, whereby diffracted lights from the recorded holograms are received by the light receiving element to verify the information recorded in the holograms.

Another holographic optical information recording/reproducing device according to another aspect of the present invention comprises a coherent light source; and beam splitting means for splitting a light from the coherent light source, wherein one of light beams split by the beam splitting means becomes a beam array modulated and arrayed by a spatial light modulating element, the beam array serving as a signal light, the other light beam split by the beam splitting means becomes a reference light, the signal light and the reference light intersect in a recording medium to generate interference fringes and the interference fringes are recoded as holograms in the recording medium at the time of recording information; and only the reference light is irradiated to the recording medium and a diffracted light generated in the recording medium is detected by a light receiving element at the time of reproducing information; wherein a light from the coherent light source is irradiated substantially only to a location on the recording medium where the holograms are recorded and multiplex recording is not saturated after the holograms are recorded in the recording medium, thereby completely exposing and saturating the recording material of the recording medium.

Another holographic optical information recording/reproducing device according to another aspect of the present invention comprises a coherent light source; and beam splitting means for splitting a light from the coherent light source, wherein one of light beams split by the beam splitting means becomes a beam array modulated and arrayed by a spatial light modulating element, the beam array serving as a signal light, the other light beam split by the beam splitting means becomes a reference light, the signal light and the reference light intersect in a recording medium to generate interference fringes and the interference fringes are recoded as holograms in the recording medium at the time of recording information; and only the reference light is irradiated to the recording medium and a diffracted light generated in the recording medium is detected by a light receiving element at the time of reproducing information; wherein the pitch of light receiving cells of the light receiving element is smaller than the pitch of spot array of the diffracted light on the light receiving element, but larger than half the pitch of the spot array.

Another holographic optical information recording/reproducing device according to another aspect of the present invention comprises a coherent light source; and beam splitting means for splitting a light from the coherent light source, wherein one of light beams split by the beam splitting means becomes a beam array modulated and arrayed by a spatial light modulating element, the beam array serving as a signal light, the other light beam split by the beam splitting means becomes a reference light, the signal light and the reference light intersect in a recording medium to generate interference fringes and the interference fringes are recoded as holograms in the recording medium at the time of recording information; and only the reference light is irradiated to the recording medium and a diffracted light generated in the recording medium is detected by a light receiving element at the time of reproducing information, wherein the length of light receiving portions of light receiving cells of the light receiving element is between 60%, inclusive, and 94%, inclusive, of the pitch of the light receiving cells of the light receiving element.

Another holographic optical information recording/reproducing device according to another aspect of the present invention comprises a coherent light source; and beam splitting means for splitting a light from the coherent light source, wherein one of light beams split by the beam splitting means becomes a beam array modulated and arrayed by a spatial light modulating element, the beam array serving as a signal light, the other light beam split by the beam splitting means becomes a reference light, the signal light and the reference light intersect in a recording medium to generate interference fringes and the interference fringes are recoded as holograms in the recording medium at the time of recording information; and only the reference light is irradiated to the recording medium and a diffracted light generated in the recording medium is detected by a light receiving element at the time of reproducing information, wherein the length of light transmitting portions of cells of the spatial light modulating element is between 55%, inclusive, and 92%, inclusive, of the pitch of the cells of the spatial light modulating element.

Another holographic optical information recording/reproducing device according to another aspect of the present invention comprises a coherent light source; and beam splitting means for splitting a light from the coherent light source, wherein one of light beams split by the beam splitting means becomes a beam array modulated and arrayed by a spatial light modulating element, the beam array serving as a signal light, the other light beam split by the beam splitting means becomes a reference light, the signal light and the reference light intersect in a recording medium to generate interference fringes and the interference fringes are recoded as holograms in the recording medium at the time of recording information; and only the reference light is irradiated to the recording medium and a diffracted light generated in the recording medium is detected by a light receiving element at the time of reproducing information, wherein apertures are provided near a surface of the recording medium at an incident side of the beam array modulated by the spatial light modulating element, and the size of the apertures is adjusted to transmit lights within a range between 0.55-fold, inclusive, and 0.9-fold, inclusive, of the main lobe of a $0^{th}$-order diffracted light diffracted when the signal light transmits through each cell of the spatial light modulating element.

Another holographic optical information recording/reproducing method according to another aspect of the present invention using a holographic optical information recording/reproducing device comprising a coherent light source, and beam splitting means for splitting a light from the coherent light source, comprising the steps of: making one of light beams split by the beam splitting means into a beam array modulated and arrayed by a spatial light modulating element, the beam array serving as a signal light, making the other light beam split by the beam splitting means into a reference light, causing the signal light and the reference light to intersect in a recording medium to generate interference fringes and recording the interference fringes as holograms in the recording medium at the time of recording information; and irradiating only the reference light to the recording medium and detecting a diffracted light generated in the recording medium by a light receiving element at the time of reproducing information, wherein the information recording step includes a step of changing the focal length of a recording lens for introducing the light from the spatial light modulating element to the recording medium.

Another holographic optical information recording/reproducing method according to another aspect of the present invention using a holographic optical information recording/reproducing device comprising a coherent light source, and beam splitting means for splitting a light from the coherent light source, comprising the steps of: making one of light beams split by the beam splitting means into a beam array modulated and arrayed by a spatial light modulating element, the beam array serving as a signal light, making the other light beam split by the beam splitting means into a reference light, causing the signal light and the reference light to intersect in a recording medium to generate interference fringes and recording the interference fringes as holograms in the recording medium at the time of recording information; and irradiating only the reference light to the recording medium and detecting a diffracted light generated in the recording medium by a light receiving element at the time of reproducing information, wherein the information recording step includes a step of introducing the light from the spatial light modulating element to the recording medium by means of a recording lens, and the information reproducing step includes a step of introducing a diffracted light from the recording medium to the light receiving element as a reproduced signal light by means of the reproduction lens having substantially the same distortion as the recording lens.

Another holographic optical information recording/reproducing method according to another aspect of the present invention using a holographic optical information recording/reproducing device comprising a coherent light source, and beam splitting means for splitting a light from the coherent light source, comprising the steps of: making one of light beams split by the beam splitting means into a beam array modulated and arrayed by a spatial light modulating element, the beam array serving as a signal light, making the other light beam split by the beam splitting means into a reference light, causing the signal light and the reference light to intersect in a recording medium to generate interference fringes and recording the interference fringes as holograms in the recording medium at the time of recording information; irradiating only the reference light to the recording medium and detecting a diffracted light generated in the recording medium by a light receiving element at the time of reproducing information; and shielding only the signal light after the recording of the holograms in the recording medium and receiving diffracted lights from the recorded holograms by means of the light receiving element to verify the information recorded in the holograms.

Another holographic optical information recording/reproducing method according to another aspect of the present invention using a holographic optical information recording/reproducing device comprising a coherent light source, and beam splitting means for splitting a light from the coherent light source, comprising the steps of: making one of light beams split by the beam splitting means into a beam array modulated and arrayed by a spatial light modulating element, the beam array serving as a signal light, making the other light beam split by the beam splitting means into a reference light, causing the signal light and the reference light to intersect in a recording medium to generate interference fringes and recording the interference fringes as holograms in the recording medium at the time of recording information; irradiating only the reference light to the recording medium and detecting a diffracted light generated in the recording medium by a light receiving element at the time of reproducing information; and irradiating a light from the coherence light source substantially only to a location on the recording medium where the holograms are recorded and multiplex recording is not saturated, thereby completely exposing and saturating the recording material of the recording medium.

Another holographic optical information recording/reproducing method according to another aspect of the present invention using a holographic optical information recording/reproducing device comprising a coherent light source, and beam splitting means for splitting a light from the coherent light source, comprising the steps of: making one of light beams split by the beam splitting means into a beam array modulated and arrayed by a spatial light modulating element, the beam array serving as a signal light, making the other light beam split by the beam splitting means into a reference light, causing the signal light and the reference light to intersect in a recording medium to generate interference fringes and recording the interference fringes as holograms in the recording medium at the time of recording information; and irradiating only the reference light to the recording medium and detecting a diffracted light generated in the recording medium by a light receiving element at the time of reproducing information, wherein the pitch of light receiving cells arrayed in the light receiving element is smaller than the pitch of a spot array of the diffracted light and larger than half the pitch of the spot array.

Another holographic optical information recording/reproducing method according to another aspect of the present invention using a holographic optical information recording/reproducing device comprising a coherent light source, and beam splitting means for splitting a light from the coherent light source, comprising the steps of: making one of light beams split by the beam splitting means into a beam array modulated and arrayed by a spatial light modulating element, the beam array serving as a signal light, making the other light beam split by the beam splitting means into a reference light, causing the signal light and the reference light to intersect in a recording medium to generate interference fringes and recording the interference fringes as holograms in the recording medium at the time of recording information; and irradiating only the reference light to the recording medium and detecting a diffracted light generated in the recording medium by a light receiving element at the time of reproducing information, wherein the length of light receiving portions of light receiving cells of the light receiving element is between 60%, inclusive, and 94%, inclusive, of the pitch of the light receiving cells.

Another holographic optical information recording/reproducing method according to another aspect of the present invention using a holographic optical information recording/reproducing device comprising a coherent light source, and beam splitting means for splitting a light from the coherent light source, comprising the steps of: making one of light beams split by the beam splitting means into a beam array modulated and arrayed by a spatial light modulating element, the length of light transmitting portions of cells of which is between 55%, inclusive, and 92%, inclusive, of the pitch of the cells, the beam array serving as a signal light, making the other light beam split by the beam splitting means into a reference light, causing the signal light and the reference light to intersect in a recording medium to generate interference fringes and recording the interference fringes as holograms in the recording medium at the time of recording information; and irradiating only the reference light to the recording medium and detecting a diffracted light generated in the recording medium by a light receiving element at the time of reproducing information.

Another holographic optical information recording/reproducing method according to another aspect of the present invention using a holographic optical information recording/reproducing device comprising a coherent light source, and beam splitting means for splitting a light from the coherent light source, comprising the steps of: making one of light beams split by the beam splitting means into a beam array modulated and arrayed by a spatial light modulating element, the beam array serving as a signal light, making the other light beam split by the beam splitting means into a reference light, causing the signal light and the reference light to intersect in a recording medium to generate interference fringes and recording the interference fringes as holograms in the recording medium at the time of recording information; and irradiating only the reference light to the recording medium and detecting a diffracted light generated in the recording medium by a light receiving element at the time of reproducing information, wherein, in the information recording step, apertures are provided near a surface of the recording medium at an incident side of the beam array modulated by the spatial light modulating element, and the size of the apertures is adjusted to transmit lights within a range between 0.55-fold, inclusive, and 0.9-fold, inclusive, of the main lobe of a $0^{th}$-order diffracted light diffracted when the signal light transmits through each cell of the spatial light modulating element.

The holographic optical information recording/reproducing devices according to the present invention are characterized by monitoring the diffraction efficiencies of the recorded holograms to change a recording density and a reproduction speed, and are useful as an external storage unit of a computer, a video/sound information storage unit or the like.

The holographic optical information recording/reproducing devices according to the present invention are characterized in that the power ratio of the reference light and the signal light at the time of recording is 5:1 or higher, and is useful as an external storage unit of a computer, a video/sound information storage unit or the like.

The holographic optical information recording/reproducing devices according to the present invention comprise the lens with a variable magnification and are useful as an external storage unit of a computer, a video/sound information storage unit or the like.

The holographic optical information recording/reproducing devices according to the present invention is characterized by verifying the recorded data immediately after the recording, and is useful as an external storage unit of a computer, a video/sound information storage unit or the like.

The holographic optical information recording/reproducing devices according to the present invention is characterized by irradiating a light having a larger power density to the holographic disc in the fixing process than at the time of recording to more completely fix residual monomers within a shorter period of time and to perform more stable data recording, and is useful as an external storage unit of a computer, a video/sound information storage unit or the like.

The holographic optical information recording/reproducing devices according to the present invention comprise the two-dimensional light receiving element whose light receiving portions are smaller than the cell pitch, and are useful as an external storage unit of a computer, a video/sound information storage unit or the like.

The holographic optical information recording/reproducing devices according to the present invention comprise the spatial light modulating element whose apertures are smaller than the cell pitch, and are useful as an external storage unit of a computer, a video/sound information storage unit or the like.

INDUSTRIAL APPLICABILITY

The holographic optical information recording/reproducing devices according to the present invention are characterized in that the power of the reference light at the time of reproduction is larger than an incident power on the holographic disc at the time of recording, and is useful as an external storage unit of a computer, a video/sound information storage unit or the like.

What is claimed is:

1. A holographic optical information recording/reproducing device, comprising a coherent light source; and a beam splitting portion for splitting a light from the coherent light source, wherein:
   one of light beams split by the beam splitting portion becomes a beam array modulated and arrayed by a spatial light modulating element, the beam array serving as a signal light, the other light beam split by the beam splitting portion becomes a reference light, the signal light and the reference light intersect in a recording medium to generate interference fringes and the interference fringes are recorded as holograms in the recording medium at the time of recording information;
   only the reference light is irradiated to the recording medium and a diffracted light generated in the recording medium is detected by a light receiving element at the time of reproducing information; and
   the power of the reference light in the recording medium for information reproduction is larger than a sum of the power of the reference light and the power of the signal light in the recording medium for information recording.

2. A holographic optical information recording/reproducing device according to claim 1, wherein the power of the reference light in the recording medium for information reproduction is larger than twice the sum of the power of the reference light and the power of the signal light in the recording medium for information recording.

3. A holographic optical information recording/reproducing device according to claim 1, further comprising a changing portion for changing a power distribution ratio of the reference light and the signal light split by the beam splitting portion.

4. A holographic optical information recording/reproducing device according to claim 3, wherein the changing portion changes the power distribution ratio depending on the recording medium.

5. A holographic optical information recording/reproducing device according to claim 3, wherein the changing portion changes the power distribution ratio depending on an incident angle of the reference light.

6. A holographic optical information recording/reproducing device according to claim 3, wherein the changing portion changes the power distribution ratio depending on a coding method of the information recorded in the recording medium.

7. A holographic optical information recording/reproducing device according to claim 1, wherein the beam splitting portion includes a polarizing beam splitter.

8. A holographic optical information recording/reproducing device according to claim 1, wherein the beam splitting portion distributes all the light power to the reference light at the time of reproducing the information.

9. A holographic optical information recording/reproducing device according to claim 1, wherein only the signal light is shielded after the holograms are recorded in the recording medium and the information recoded in the holograms is verified by receiving diffracted lights from the recorded holograms by means of the light receiving element.

10. A holographic optical information recording/reproducing device according to claim 9, further comprising a changing portion for setting a power distribution ratio such that the reference light and the signal light are incident on the recording medium at the time of recording the information and changing the power distribution ratio such that all the light power is distributed to the reference light after the recording of the information.

11. A holographic optical information recording/reproducing device according to claim 10, wherein the changing portion includes an EO modulator.

12. A holographic optical information recording/reproducing device according to claim 10, wherein the light receiving element discharges accumulated light electric charges once when the changing portion changes the power distribution ratio to distribute all the light power to the reference light.

13. A holographic optical information recording/reproducing device according to claim 10, wherein a time during which the holograms are recorded in a state where the changing portion sets the power distribution ratio to cause the reference light and the signal light to be incident on the recording medium at the time of recording the information is longer than a time during which the holograms are reproduced in a state where the changing portion changes the power distribution ratio so as to distribute all the light power to the reference light after the recording of the information.

14. A holographic optical information recording/reproducing device according to claim 10, a relative positional relationship of the reference light and the recording medium is so maintained as not to move longer than a specified distance during a period in which the holograms are reproduced in a state where the changing portion changes the power distribution ratio to distribute all the light power to the reference light after the recording of the information by a shift multiplexing method.

15. A holographic optical information recording/reproducing device according to claim 10, wherein the diffraction efficiencies of the recorded holograms are detected during the period in which the changing portion changes the power distribution ratio to distribute all the light power to the reference light after the recording of the information.

16. A holographic optical information recording/reproducing device according to claim 8, further comprising light shielding portion arranged in the light path of the signal light to shield the signal light.

17. A holographic optical information recording/reproducing device according to claim 1, wherein a light from the coherent light source is irradiated substantially only to a location on the recording medium where the holograms are recorded and the multiplex recording is not saturated after the recording of the holograms in the recording medium, thereby completely exposing and saturating the recording material of the recording medium.

18. A holographic optical information recording/reproducing device according to claim 1, further comprising a fixing light source for irradiating a light substantially only to a location on the recording medium where the holograms are recorded and the multiplex recording is not saturated after the recording of the holograms in the recording medium, thereby completely exposing and saturating the recording material of the recording medium.

19. A holographic optical information recording/reproducing device according to claim 1, further comprising a reproduction lens for introducing a diffracted light from the recording medium as a reproduced signal light to the light receiving element, wherein the focal length of the reproduction lens is variable.

20. A holographic optical information recording/reproducing device according to claim 19, wherein the number of the light receiving cells of the light receiving element is larger than the number of the beams of the reproduced signal light, and the light receiving cells of the light receiving element are arrayed in a range larger than the size of the beam array of the reproduced signal lights.

21. A holographic optical information recording/reproducing device according to claim 1, further comprising a recording lens for introducing a light from the spatial light modulating element to the recording medium, wherein the focal length of the recording lens is variable.

22. A holographic optical information recording/reproducing device according to claim 1, further comprising:
   a recording lens for introducing a light from the spatial light modulating element to the recording medium; and
   a reproduction lens for introducing a diffracted lights from the recording medium as a reproduced signal light to the light receiving element;
   wherein the recording lens and the reproduction lens have substantially the same distortion.

23. A holographic optical information recording/reproducing device according to claim 1, wherein the length of light receiving portions of the respective light receiving cells of the light receiving element is between 60%, inclusive, and 94%, inclusive, of the pitch of the light receiving cells of the light receiving element.

24. A holographic optical information recording/reproducing device according to claim 1, wherein the length of light transmitting portions of the respective cells of the spatial light modulating element is between 55%, inclusive, and 92%, inclusive, of the pitch of the cells of the spatial light modulating element.

25. A holographic optical information recording/reproducing device according to claim 1, wherein:
- apertures are provided near a surface of the recording medium at an incident side of the beam array modulated by the spatial light modulating element; and
- the size of the apertures is adjusted to transmit lights within a range between 0.55-fold, inclusive, and 0.9-fold, inclusive, of the main lobe of a $0^{th}$-order diffracted light diffracted when the signal light transmits through each cell of the spatial light modulating element.

26. A holographic optical information recording/reproducing device according to claim 1, wherein the pitch of the light receiving cells of the light receiving element is smaller than the pitch of the spot array of the diffracted light on the light receiving element, but larger than half the pitch of the spot array.

27. A holographic optical information recording/reproducing method using a holographic optical information recording/reproducing device comprising a coherent light source, and a beam splitting portion for splitting a light from the coherent light source, comprising the steps of:
- making one of light beams split by the beam splitting portion into a beam array modulated and arrayed by a spatial light modulating element, the beam array serving as a signal light, making the other light beam split by the beam splitting portion into a reference light, causing the signal light and the reference light to intersect in a recording medium to generate interference fringes and recording the interference fringes as holograms in the recording medium at the time of recording information; and
- irradiating only the reference light to the recording medium and detecting a diffracted light generated in the recording medium by a light receiving element at the time of reproducing information;
- wherein the power of the reference light in the recording medium for information reproduction is larger than a sum of the power of the reference light and the power of the signal light in the recording medium for information recording.

\* \* \* \* \*